US012636912B2

(12) United States Patent
Brockman et al.

(10) Patent No.: US 12,636,912 B2
(45) Date of Patent: May 26, 2026

(54) VEHICLE WHEEL MOUNTING APPARATUS

(71) Applicant: Talo Holdings Ltd., Leduc County (CA)

(72) Inventors: Theodore Brockman, Leduc County (CA); Zoltan Banyi, Surrey (CA)

(73) Assignee: Talo Holdings Ltd., Leduc County (CA)

( * ) Notice: Subject to any disclaimer, the term of this patent is extended or adjusted under 35 U.S.C. 154(b) by 420 days.

(21) Appl. No.: 18/490,066

(22) Filed: Oct. 19, 2023

(65) Prior Publication Data

US 2024/0131864 A1      Apr. 25, 2024
US 2024/0227441 A9      Jul. 11, 2024

Related U.S. Application Data

(60) Provisional application No. 63/417,355, filed on Oct. 19, 2022.

(51) Int. Cl.
*B60B 30/02*      (2006.01)
*B60B 29/00*      (2006.01)
*B60B 30/10*      (2006.01)

(52) U.S. Cl.
CPC ............ *B60B 30/02* (2013.01); *B60B 29/002* (2013.01); *B60B 30/10* (2013.01)

(58) Field of Classification Search
CPC ............... B66F 7/246; B62B 2202/031; B62B 2206/02; B60B 29/002; B60B 30/02; B60B 30/10
See application file for complete search history.

(56) References Cited

U.S. PATENT DOCUMENTS

| | | | | |
|---|---|---|---|---|
| 785,560 | A | * | 3/1905 | La Rue .................... A47H 1/13 |
| | | | | 248/252 |
| 2,380,415 | A | * | 7/1945 | Carruthers ............ B60B 29/002 |
| | | | | 105/215.1 |
| 2,392,409 | A | | 1/1946 | Ray |
| 2,414,383 | A | * | 1/1947 | Merriam ................. B66F 7/246 |
| | | | | 70/237 |
| 3,976,212 | A | | 8/1976 | Sanchez |
| 4,555,089 | A | | 11/1985 | Eck |
| 4,690,605 | A | | 9/1987 | Coccaro |

(Continued)

FOREIGN PATENT DOCUMENTS

| | | |
|---|---|---|
| EP | 0125551 B1 | 11/1987 |
| EP | 0995616 A1 | 4/2000 |

(Continued)

*Primary Examiner* — Mark C Hageman
(74) *Attorney, Agent, or Firm* — Nicholas Garner; Oyen Wiggs Green & Mutala LLP

(57) ABSTRACT

There is provided a vehicle wheel mounting apparatus according to one aspect. The apparatus includes first and second L-shaped members which telescopically couple together and rollers rotatably coupled to the L-shaped members.

There is also provided a vehicle wheel mounting apparatus according to another aspect. The apparatus includes a pair of wheel-mounted elongate members, a pair of rollers rotatably coupled to respective said elongate members, and a pair of channels via which the elongate members are telescoping coupled together. Each of the channels is u-shaped in lateral section.

20 Claims, 16 Drawing Sheets

(56)     References Cited

U.S. PATENT DOCUMENTS

| 4,692,082 | A | * | 9/1987 | Smith | B66F 7/246 |
| | | | | | 74/89.14 |
| 4,801,237 | A | | 1/1989 | Yamamoto | |
| 4,854,803 | A | | 8/1989 | Coccaro | |
| 4,976,449 | A | | 12/1990 | Lotspeich et al. | |
| 5,007,789 | A | | 4/1991 | Painter | |
| 5,039,123 | A | * | 8/1991 | Smeitink | B66F 7/246 |
| | | | | | 280/37 |
| 5,049,025 | A | * | 9/1991 | Roman | B66F 5/025 |
| | | | | | 414/429 |
| 5,112,070 | A | | 5/1992 | Hahn | |
| 5,176,487 | A | | 1/1993 | Flitton | |
| 6,079,941 | A | * | 6/2000 | Lee | B62B 3/04 |
| | | | | | 414/812 |
| 6,382,644 | B1 | | 5/2002 | Rawlings | |
| 6,783,147 | B1 | * | 8/2004 | Green, Sr. | B62B 1/20 |
| | | | | | D34/12 |
| 7,097,406 | B1 | | 8/2006 | Gang | |
| 7,597,524 | B2 | | 10/2009 | Hernandez | |
| 7,635,134 | B2 | | 12/2009 | Hedley et al. | |
| 7,708,516 | B1 | | 5/2010 | Snook | |
| 7,762,566 | B2 | * | 7/2010 | Wang | B62B 5/0083 |
| | | | | | 280/651 |
| 8,720,522 | B2 | | 5/2014 | Combs | |
| 8,882,434 | B2 | | 11/2014 | LaBruyere | |
| 10,035,688 | B1 | * | 7/2018 | Robinson | B66F 5/00 |
| 2001/0038094 | A1 | | 11/2001 | Lundy, Sr. et al. | |
| 2003/0012630 | A1 | | 1/2003 | Brabson, Jr. | |
| 2006/0045683 | A1 | | 3/2006 | Huiming et al. | |
| 2007/0166137 | A1 | | 7/2007 | Toal | |
| 2007/0182115 | A1 | * | 8/2007 | Groomes | B62D 43/002 |
| | | | | | 280/79.4 |
| 2007/0286713 | A1 | | 12/2007 | Giese | |
| 2011/0203091 | A1 | | 8/2011 | Silvestri et al. | |
| 2015/0290972 | A1 | | 10/2015 | Minor et al. | |
| 2018/0170728 | A1 | | 6/2018 | Chen et al. | |
| 2019/0010034 | A1 | | 1/2019 | Edwards, Sr. | |

FOREIGN PATENT DOCUMENTS

| EP | 1839905 | B1 | 5/2009 |
| EP | 2803499 | A1 | 11/2014 |
| EP | 2338696 | B1 | 4/2015 |
| FR | 2301397 | A1 | 9/1976 |
| WO | 2005123419 | A1 | 12/2005 |
| WO | 2011132186 | A1 | 10/2011 |

* cited by examiner

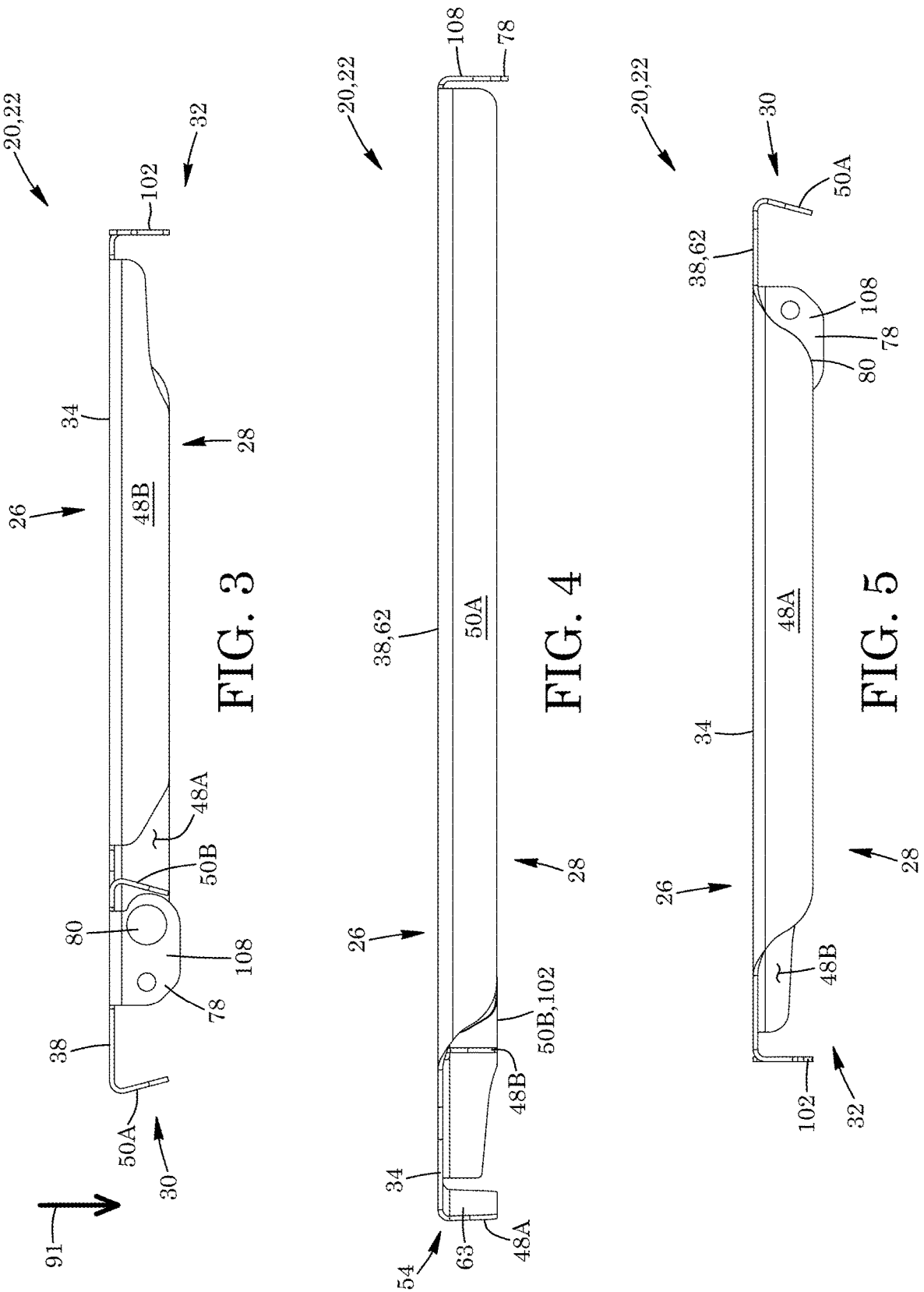

VEHICLE WHEEL MOUNTING APPARATUS

BACKGROUND OF THE INVENTION

Field of the Invention

There is provided a mounting apparatus. In particular, there is provided a vehicle wheel mounting apparatus.

Description of the Related Art

U.S. Pat. No. 7,597,524 to Hernandez discloses a wheel dolly. The wheel dolly is suited to serve as both an automobile jack. The wheel dolly is capable of holding large loads aloft for extended periods. The wheel dolly relies on only mechanical systems and eliminating hydraulic systems. The wheel dolly does not include extended arms, handles, or levers for pumping or rotating the lifting mechanisms. Each lifting element terminates in only a single nut exposed to the user. Preferably, each nut of each lifting system has the same plan dimensions as the other, thus providing the advantage of allowing the user to operate the dolly with a driver and only one socket.

European Patent No. 2338696 B1 to Askling discloses a wheel lift with a U-shaped frame where, for lifting of a tractor or machine wheel that is to be mounted or demounted, the U-shaped frame on the lateral parts of the frame has one or several rollers essentially in parallel with the lateral parts and allowing rotation of a lifted wheel. The lateral parts of the frame each comprise two or several parts, one fixed to the central part of the frame and one or several in relation to this displaceable part, so that the lateral parts become variable to their length. The rollers are arranged on the displaceable part in respective lateral part. Supporting wheels are arranged in the moveable part in respective lateral part furthest from the central part.

U.S. Pat. No. 4,854,803 to Coccaro discloses an apparatus and method for jacking and dollying a vehicle wheel assembly, while the assembly remains affixed to the vehicle. The wheel assembly includes a pneumatic tire, a wheel and an axle. The apparatus features a "U" shaped framework having telescoping body section members to which orthogonally extending arms are attached. Wheel assembly engaging elements in the form of roller assemblies are mounted on the framework arms for engaging the tire of a wheel assembly located therebetween for lifting. The apparatus also includes an actuator mounted on the framework body section members for driving the roller assemblies against the wheel assembly tire to cause lift, and form the framework and roller assemblies into a carriage for retaining the wheel assembly. Still further, the framework is mounted on casters to enable transport of the supported wheel assembly and framework. The actuator is preferably foot operated and includes a bi-directional, double pawl, lever ratchet mechanism having a lever pivotally mounted to one body section member together with a first and a second pawl, and a rack provided at the other body section member. The actuator also includes direction control elements having a first setting to enable the apparatus to lift the wheel assembly, and a second setting to enable the apparatus to lower the wheel assembly. The method features steps for driving a plurality of wheel engaging elements, at least one of which includes a roller assembly, against the tread face of the tire of the wheel assembly to be lifted by leveraging for a predetermine distance the coupling member of one wheel engaging element from a fulcrum located on the coupling member of another wheel engaging element, then bracing the coupling members against separation, and thereafter, resetting and re-leveraging to successively drive the wheel engaging elements against the wheel assembly to produce lift.

U.S. Pat. No. 5,112,070 to Hahn discloses a dual wheel puller/dolly. The dolly consists of a pair of mobile elongated frame members with an elongated rod extending transversely therebetween and a jack mechanism cooperative with the rod. An elongated roller is rotatively mounted onto the top of each frame member to engage with a pair of large heavy motor vehicle wheels. When the jack mechanism is operated the large heavy wheels will be lifted upwardly to be moved about. One of the elongated frame members can also be used with other components, such as a pair of chains and a socket, as a wheel hub puller so as to facilitate the removal of a wheel bearing therefrom.

BRIEF SUMMARY OF INVENTION

There is provided, and it is an object to provide, an improved vehicle wheel mounting apparatus disclosed herein.

There is accordingly provided a vehicle wheel mounting apparatus according to one aspect. The vehicle wheel mounting apparatus includes first and second L-shaped members which telescopically couple together. The vehicle wheel mounting apparatus includes rollers rotatably coupled to the L-shaped members. The L-shaped members are made of sheet metal according to one non-limiting embodiment.

There is also provided a vehicle wheel mounting apparatus according to another aspect. The vehicle wheel mounting apparatus includes a pair of wheel-mounted elongate members. The vehicle wheel mounting apparatus includes a pair of rollers rotatably coupled to respective said elongate members. The pair of rollers may be referred to as a pair of vehicle wheel supporting side rollers. The vehicle wheel mounting apparatus includes a pair of channels via which the elongate members are telescoping coupled together. Each of the channels is u-shaped in lateral section. In one non-limiting embodiment, the channels are acute angle u-shaped in cross-section in order to provide guiding in two perpendicular planes and telescoping translation along the channels.

There is further provided a vehicle wheel mounting apparatus according to an additional aspect. The vehicle wheel mounting apparatus includes a pair of rollers. The vehicle wheel mounting apparatus includes a pair of wheel-mounted elongate members. Each said elongate member includes a first pair of spaced-apart bent portions via which a respective said roller is rotatably coupled thereto. Each said elongate member includes a second pair of spaced-apart bent portions which form a channel. The channels telescopically couple together. The vehicle wheel mounting apparatus includes an actuator coupled to the elongate members, with selective actuation thereof enabling spacing between the rollers to be adjusted.

There is also provided a vehicle wheel mounting apparatus according to one aspect. The vehicle wheel mounting apparatus includes a pair of wheel-mounted elongate members with respective rollers coupled thereto. The vehicle wheel mounting apparatus includes an actuator configured to enable the elongate members to move from a retracted position to an extended position, with the rollers being closer together in the retracted position and more spaced-apart in the extended position. The elongate members are shaped to substantially enclose the actuator along the top and sides thereof and enable the actuator to be accessible via the bottom thereof.

There is yet further provided a vehicle wheel mounting apparatus according to yet an additional aspect. The vehicle wheel mounting apparatus includes a pair of wheel-mounted elongate members with respective rollers coupled thereto. The vehicle wheel mounting apparatus includes an elongate threaded member threadably coupling to and extending between the elongate members, with actuation thereof selectively adjusting spacing of the rollers. The elongate threaded member is substantially enclosed along a top and sides thereof and is accessible via a bottom thereof.

There is yet also provided a vehicle wheel mounting apparatus comprising. The apparatus includes a pair of wheel-mounted elongate members. The apparatus includes a pair of rollers rotatably coupled to respective said elongate members. The elongate members telescopically couple together. At least one of the elongate members includes a channel with a longitudinally-extending portion and first and second peripheral portions coupling to and extending along sides of the longitudinally-extending portion thereof. The first peripheral portion of the channel extends at an acute angle relative to the longitudinally-extending portion of the channel. The second peripheral portion of the channel extends at an acute angle relative to the longitudinally-extending portion of the channel.

There is also provided a method of manufacturing a vehicle wheel mounting apparatus according to one aspect. The method includes forming a pair of L-shaped blanks. Each of the blanks comprises a laterally-extending portion and a longitudinally-extending portion. The method includes forming a pair of roller mounts by bending spaced-apart ends of the laterally-extending portions of the blanks in a first direction. The method includes rotatably coupling rollers to the roller mounts. The method includes forming a pair of telescoping channels by bending sides of the longitudinally-extending portions of the blanks in a second direction opposite the first direction. The method includes operatively connecting together the channels via a length adjustment mechanism, with positioning of the rollers being adjustable thereby.

It is emphasized that the invention relates to all combinations of the above features, even if these are recited in different claims.

Further aspects and example embodiments are illustrated in the accompanying drawings and/or described in the following description.

BRIEF DESCRIPTION OF DRAWINGS

The accompanying drawings illustrate non-limiting example embodiments of the invention.

FIG. 3 is a first end elevation view of the first L-shaped member of FIG. 1;

FIG. 4 is an outer side elevation view of the first L-shaped member of FIG. 1;

FIG. 5 is a second end elevation view of the first L-shaped member of FIG. 1;

DESCRIPTION OF THE PREFERRED EMBODIMENTS

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 11:
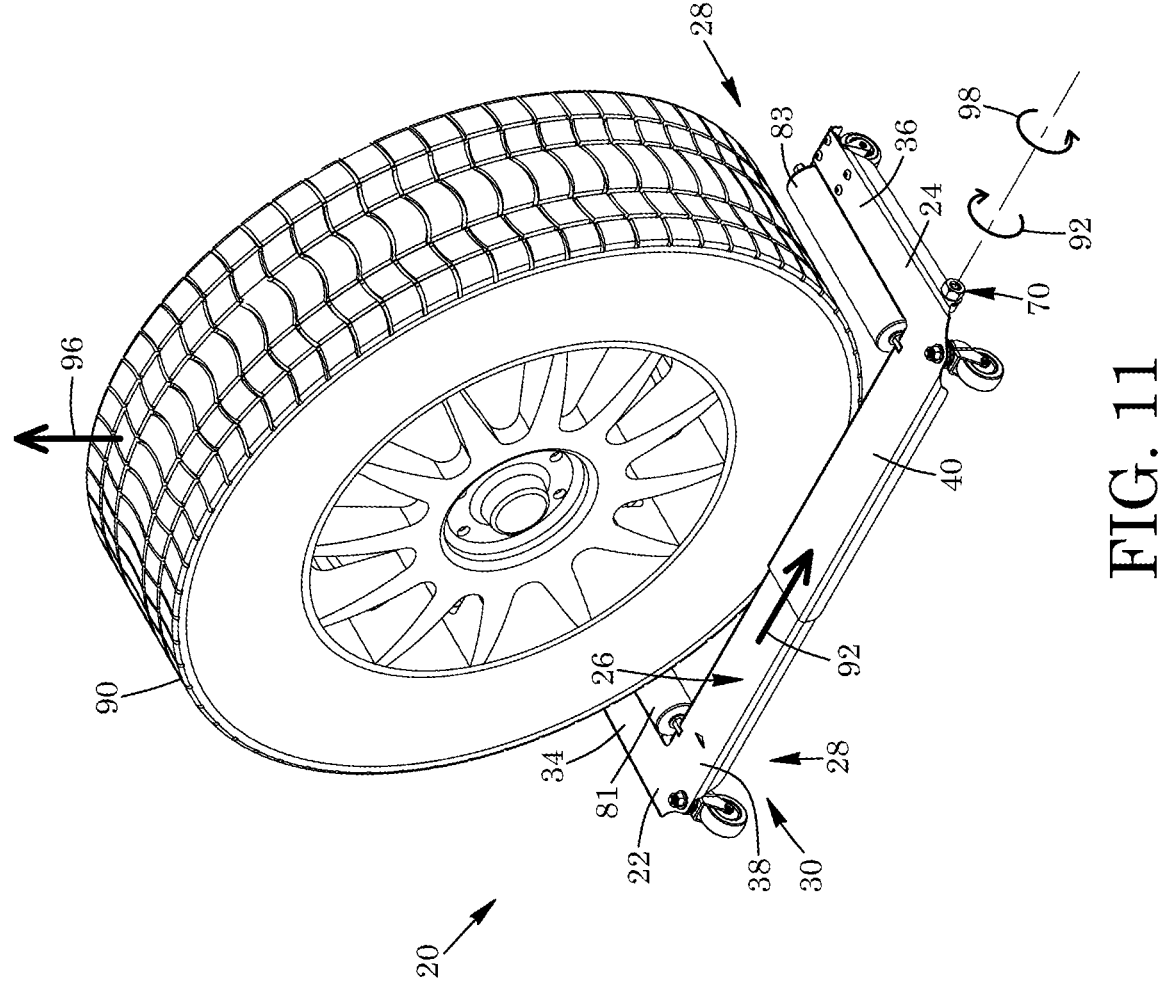
FIG. 11 is a first end, channel side, top perspective view of the vehicle wheel mounting apparatus of FIGS. 1 and 6, with the first subassembly thereof of FIG. 1 and the second subassembly thereof of FIG. 6 shown telescopically coupled together in a partially retracted position, with a vehicle wheel positioned between rollers of the vehicle wheel mounting apparatus.

Referring to the drawings and first to FIG. 11, there is shown a vehicle wheel mounting apparatus 20 according to one non-limiting embodiment. The vehicle wheel mounting apparatus may be referred to as a wheel lift, a wheel boost, a wheel booster or a wheel dolly for example. The vehicle wheel mounting apparatus includes a first and second elongate members, in this example first and second L-shaped members 22 and 24. The L-shaped members may each be referred to respective halves of framing of vehicle wheel mounting apparatus 20. L-shaped members 22 and 24 may be referred to as individually or collectively as a chassis of the vehicle wheel mounting apparatus. Each L-shaped member has a top 26, a bottom 28 and a pair of spaced-apart sides 30 and 32. L-shaped members 22 and 24 are substantially planar and the L-shaped members may be referred to as planar members. The L-shaped members are L-shaped in top and bottom profile. Each L-shaped member is made of sheet metal in this example, in this case sheet steel; however, the latter is not strictly required and other materials may be used in other embodiments.

Figure 12:
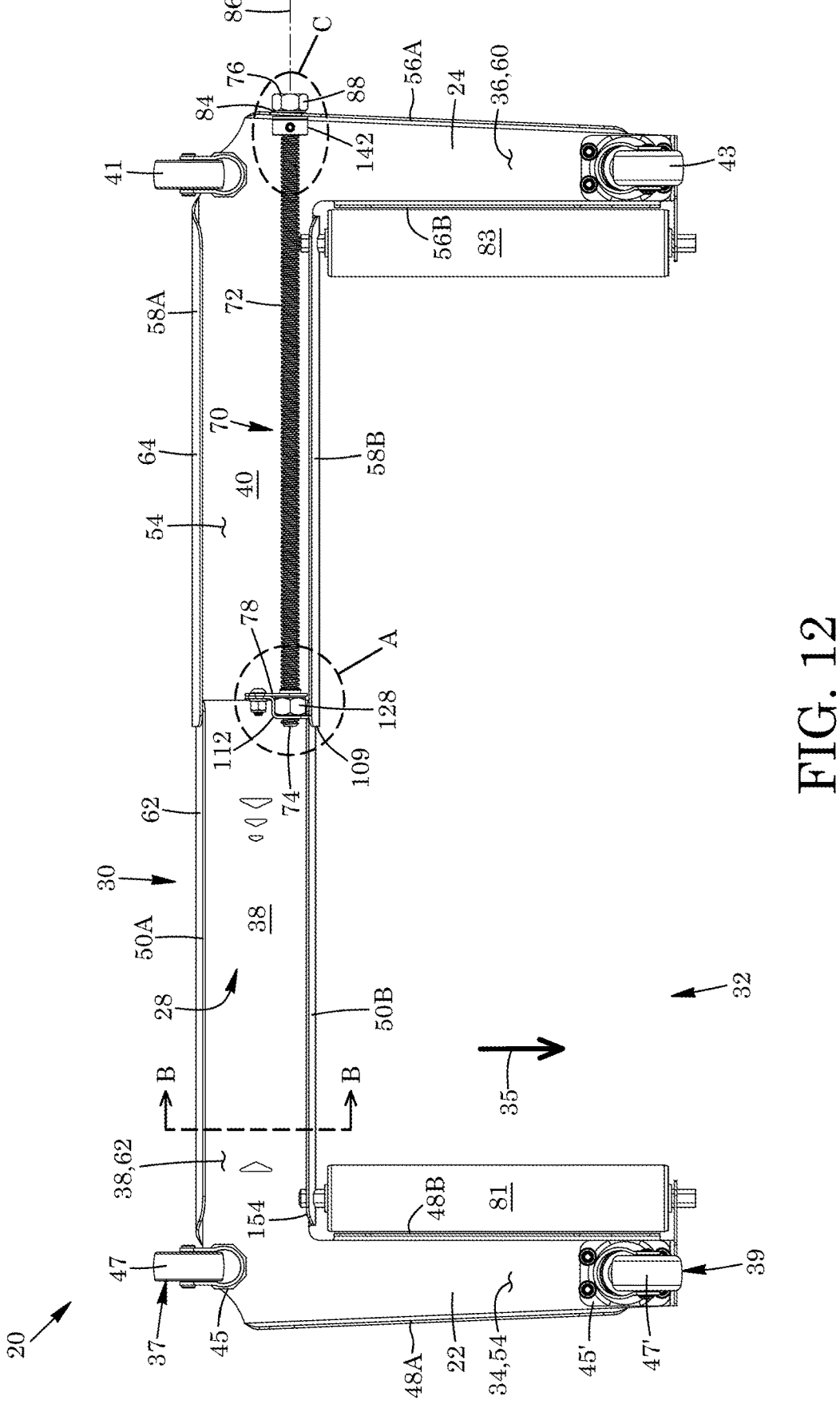
FIG. 12 is a bottom plan view of the vehicle wheel mounting apparatus of FIG. 11, with the vehicle wheel not being shown and with the subassemblies shown in a fully extended position.

As seen in FIG. 12, L-shaped members 22 and 24 each include laterally-extending portions 34 and 36. The laterally-extending portions of the L-shaped members are spaced-apart from each other and extend in parallel with each other. Laterally-extending portions 34 and 36 of L-shaped members 22 and 24 taper slightly in this example in a direction 35 extending from side 30 to side 32 of vehicle wheel mounting apparatus 20; however, this is not strictly required. Each laterally-extending portion of its respective L-shaped member is trapezoidal in top and bottom plan view in this example; however, here too this is not strictly required.

Vehicle wheel mounting apparatus 20 includes a plurality of wheel assemblies, in this example dolly wheel assemblies, in this example casters 37, 39, 41 and 43. The casters are swivel casters in this example. In this case a first pair of spaced-apart casters 37 and 39 rotatably couple to laterally-extending portion 34 of L-shaped member 22 and a second pair of spaced-apart casters 41 and 43 rotatably couple to laterally-extending portion 36 of L-shaped member 24. The L-shaped members may thus be referred to as a pair of wheel-mounted elongate members.

Figure 1:
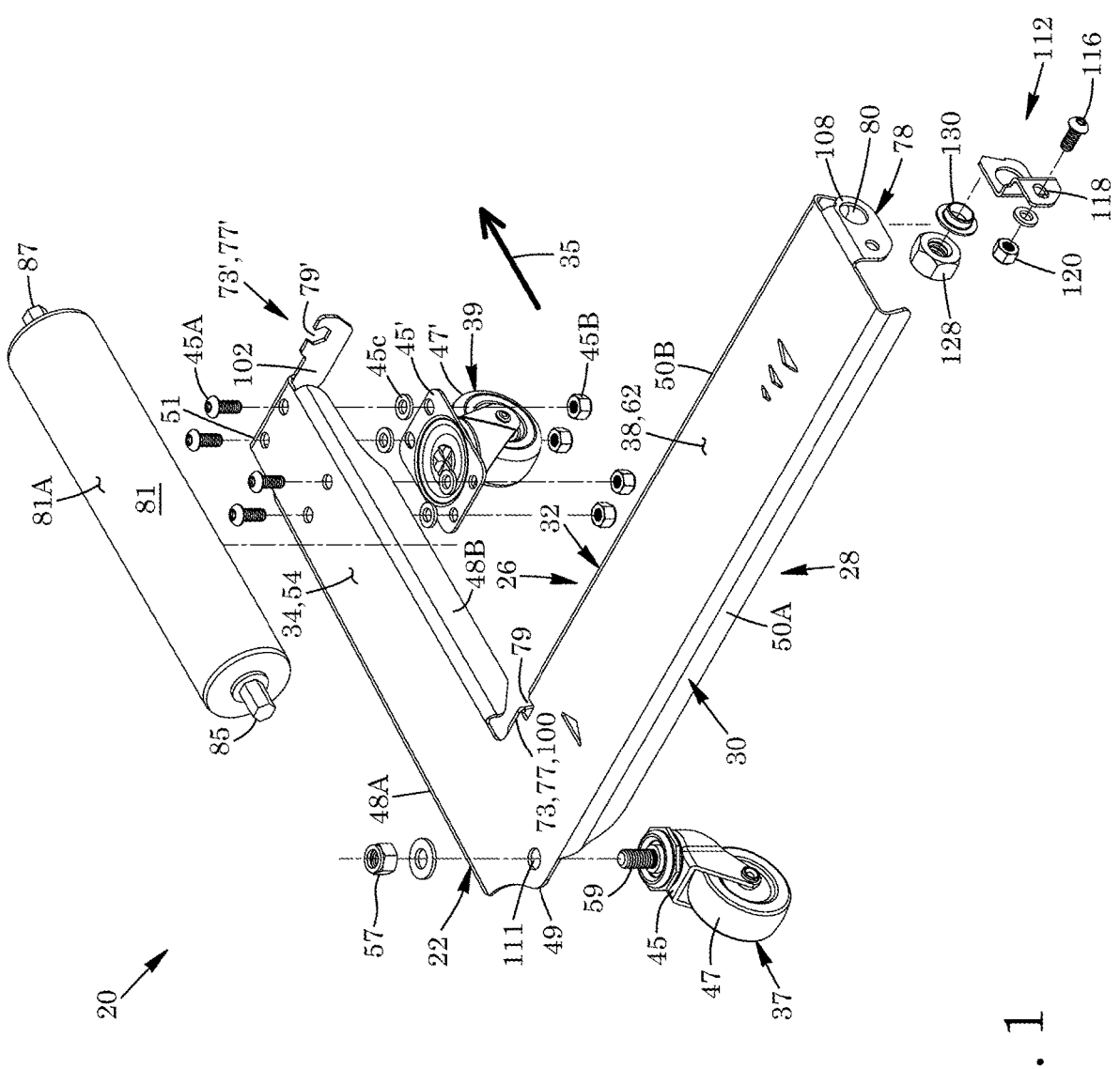
FIG. 1 is a first end, channel side, top perspective exploded view of a first subassembly of a vehicle wheel mounting apparatus according to one aspect, the first subassembly including a first L-shaped member.
Figure 6:
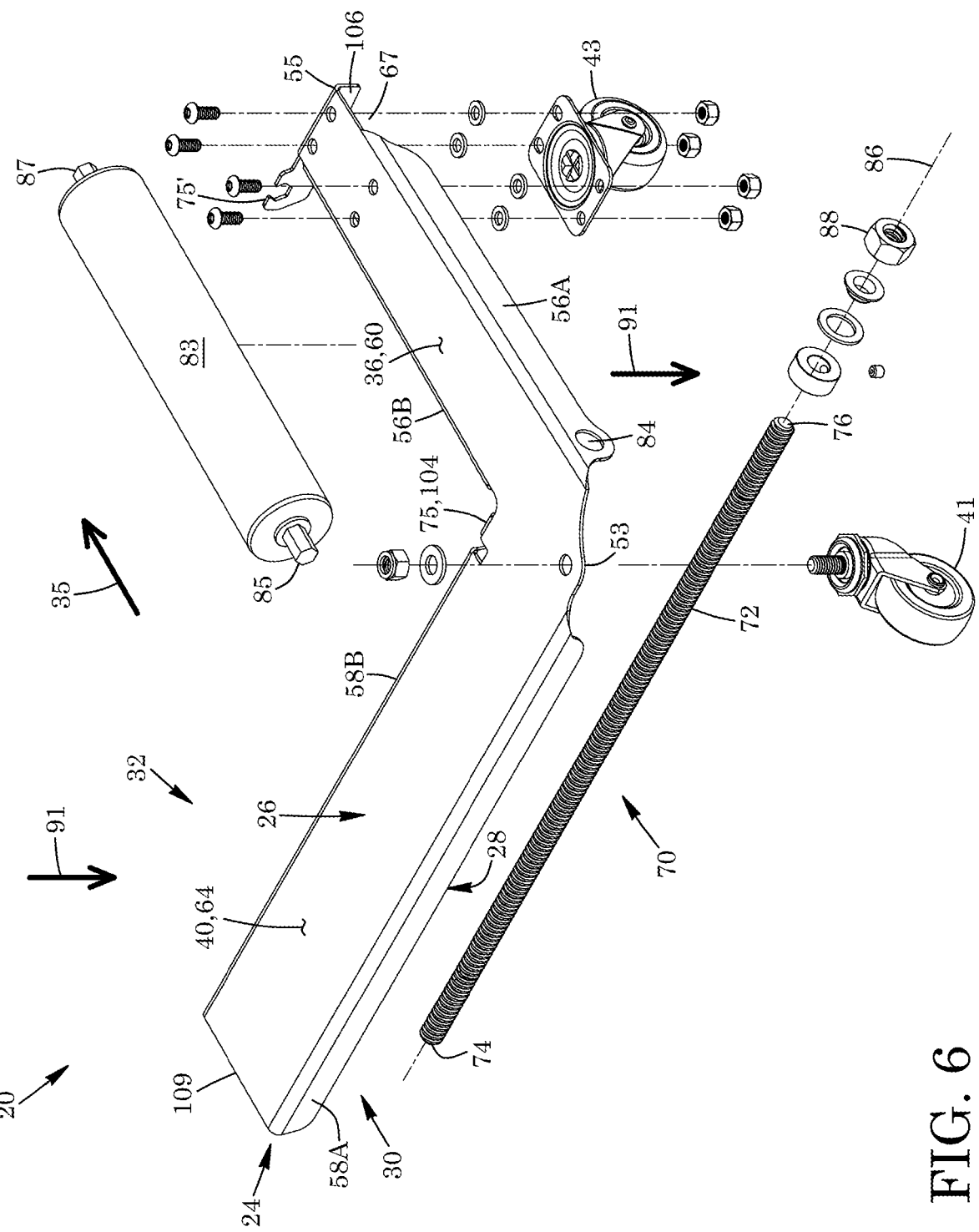
FIG. 6 is a first end, channel side, top perspective exploded view of a second subassembly of the vehicle wheel mounting apparatus, the second subassembly including a second L-shaped member.

Referring to FIG. 1, for each L-shaped member 22 casters 37 and 39 associated therewith include mounts 45/45' and dolly wheels 47/47' rotatably coupled to the mounts thereof. The mount of each wheel couples to its respective L-shaped member in this example. In this non-limiting embodiment mount 45 couples to L-shaped member 22 via shaft 59 extending through respective aperture 111 of the L-shaped member adjacent outer corner 49 of the L-shaped member. A female member in this non-limiting example a nut 57 threadably couples to the distal end portion of the shaft thereafter. Referring to FIGS. 1 and 6, casters 37 and 41 may thus comprise and be referred to as center pivot shaft mount casters in this non-limiting embodiment. Other types of casters or wheels may be used in other embodiments.

Casters 39 and 43 seen in FIG. 12 in this non-limiting example comprise flange mount casters. Referring to FIG. 1, casters 39 in this embodiment includes a flange said mount 45' which abuts a respective L-shaped member 22 and couples thereto via fasteners, in this example one or more screws 45A, nuts 45B and washers 45C positioned therebetween. However, here too this is not strictly required and other types of casters or wheels may be used in other embodiments.

Figure 2:
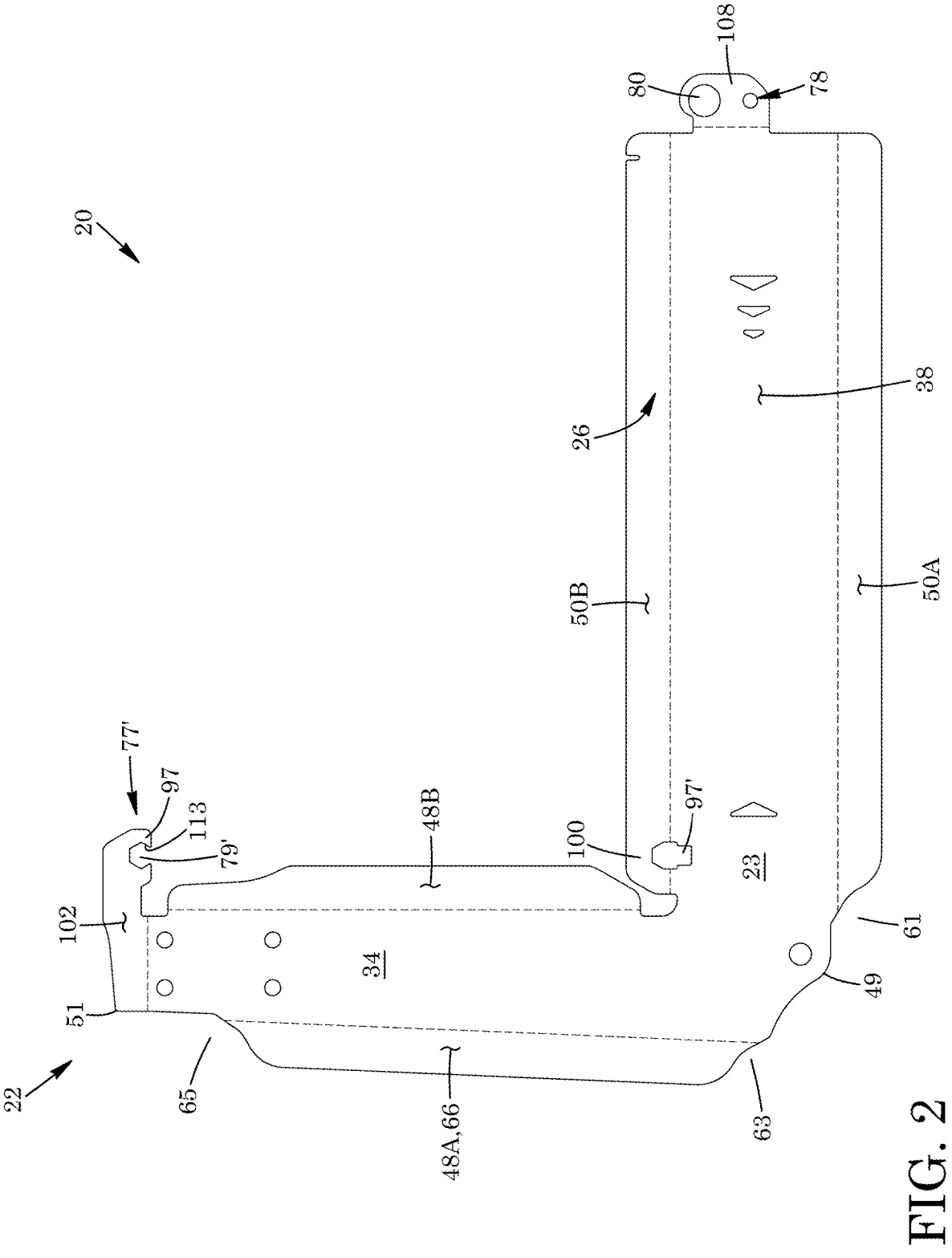
FIG. 2 is a top plan view of a first L-shaped blank prior to being bent into the first L-shaped member of the first subassembly of FIG. 1.
Figure 7:
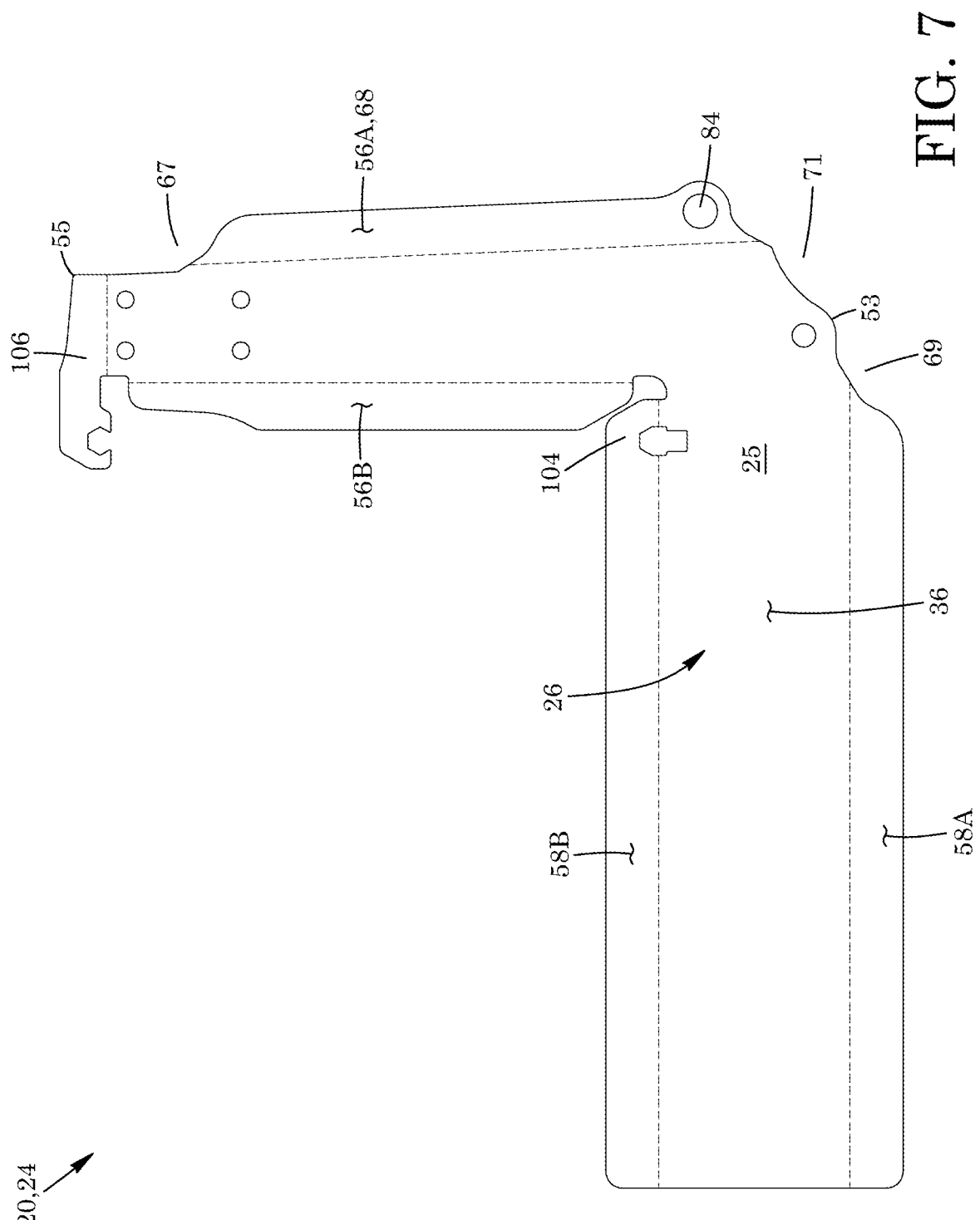
FIG. 7 is a top plan view of a second L-shaped blank prior to being bent into the second L-shaped member of the second subassembly of FIG. 6.

As seen in FIGS. 2 and 7, L-shaped members 22 and 24 in this non-limiting embodiment have recessed regions 61/63, 65, 67, and 69/71 adjacent outer corners 49, 51, 53 and 55 thereof, respectively. The recessed regions are shaped to facilitate rotation of respective dolly wheels 47 of casters 37, 39, 41 and 43 seen in FIG. 12. Referring back to FIGS. 2 and 7, recessed regions 61/63, 65, 67 and 69/71 may be referred to as but need not be cut-outs or cut-out regions. Casters per se, including their various parts and functionings, are known per se, and casters 37, 39, 41 and 43 seen in FIG. 12 will accordingly not be described in further detail.

Referring to FIGS. 1 and 6, vehicle wheel mounting apparatus 20 includes a pair of roller mounts 73/73' and 75/75'. Each roller mount is in the form of a fixed bent tab in this non-limiting embodiment. Each roller mount couples to a respective L-shaped member, in this example coupling to and extending outwards from laterally-extending portions 34 and 36 of L-shaped members 22 and 24, respectively. Roller mounts 73/73' and 75/75' couple to and extend downwards from top 26 of respective L-shaped members in this non-limiting example. However, the latter is not strictly required and the roller mounts may extend laterally outwards or upwards from the L-shaped members in other embodiments.

Each roller mount comprises a pair of spaced-apart brackets, in this non-limiting example spaced-apart L-shaped brackets 77 and 77'. Each bracket in this example has a slot 79/79'. Each slot has a recess that is hexagonal shaped in part in this non-limiting example.

Bracket 77 is integrally connected to and formed with laterally-extending portion 34 of its respective L-shaped member 22 so as to form a unitary whole in this example. Each bracket is curved at least in part in this example; however, this is not strictly required. Roller mounts 73' and 75' seen in FIGS. 1 and 6 in this non-limiting example comprise bent portions of the laterally-extending portions of L-shaped members 22 and 24. Roller mounts 73 and 75 in this non-limiting example comprise bent portions of longitudinally-extending portions 38 and 40 of L-shaped members 22 and 24. The roller mounts may be referred to as downwardly-bent portions of the L-shaped members. Roller mounts 73/73' and 75/75' are bent in a first or downward direction 91 in this example.

Figure 13:
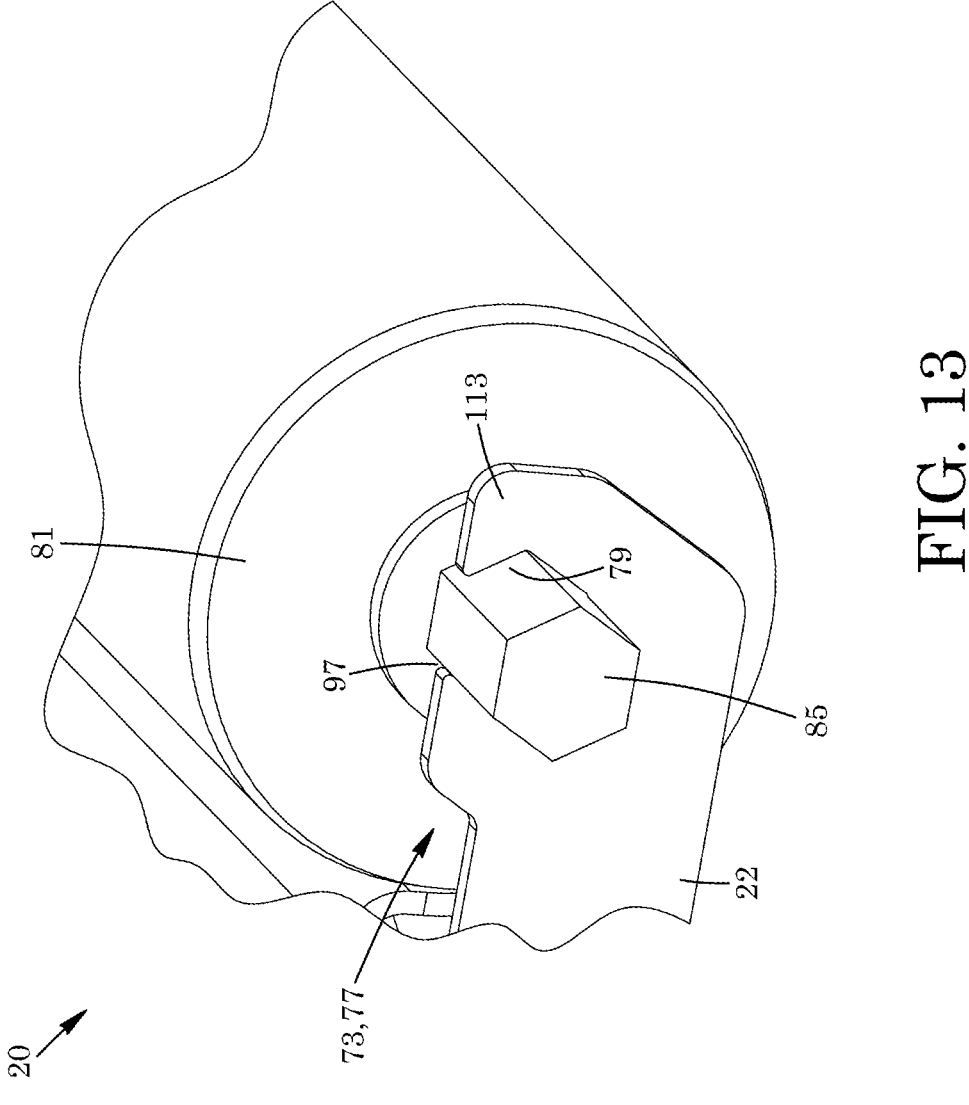
FIG. 13 is an enlarged top perspective view of a roller mount, shaft and roller of the vehicle wheel mounting apparatus of FIG. 11, with the apparatus shown in fragment.

As seen in FIGS. 1 and 6, vehicle wheel mounting apparatus 20 includes a pair of spaced-apart rollers 81 and 83. Roller mounts 73/73' and 75/75' are shaped to receive therebetween and rotatably couple to respective rollers. In this example a pair of shafts extend axially outwards in opposite direction from each respective roller: this is seen by shafts 85 and 87 extending axially outwards from roller 81 in FIG. 1. The shafts are spring-loaded in this non-limiting example; however, this is not strictly required and only one or neither of the shafts may be spring-loaded in other embodiments. Each roller 81 includes a body 81A which is rotatable relative to shafts 85 and 87 thereof in this example. As seen in FIG. 13, each shaft 85 is hexagonal in cross-section; however, this is not strictly required. Referring to FIGS. 1 and 6, the shafts are received within mating slots 79/79' of brackets 77/77', with the rollers being rotatable relative to roller mounts 73 and 75 thereby. Alternatively, body 81A and shafts 85 and 87 of roller 81 may fixedly couple together, with the shafts being rotatable relative to corresponding roller mounts 73/73'. As a further non-limiting alternative, the rollers may rotatably couple to L-shaped members 22 and 24 in other manners in other embodiments such as via a pair of male members coupled to and extending inwards from the brackets to rotatably engage with corresponding female recesses of the rollers. In this example and referring to FIG. 1, each side roller 81 is thus configured to be installed between the two bent fixed tabs or roller mounts 73/73' by shifting the rollers' spring-loaded hexagonal shafts 85 and 87.

As seen in FIG. 13, at least a portion of each bracket 77, in this example a protrusion or tab 113 encloses in part an opening 97 of slot 79. Tab 113 is positioned adjacent the opening and is shaped to inhibit inadvertent dislodgement of shaft 85 from the recess. Referring to FIG. 1, in this non-limiting embodiment, each roller 81 releasably couples to its respective mounts 73/73' by inserting a first spring-loaded shaft 85 within a respective slot 79 of mount 73, then shifting a second spring-loaded shaft 87 axially so as to fit within slot 79' of mount 73'.

This example of releasably coupling the rollers to the L-shaped members 22 and 24 is not strictly required and other manners of coupling to the couples to the L-shaped members are possible in other embodiments. For example, in another embodiment (not shown), upon roller 81 being positioned in place within slot 79, tab 113 seen in FIG. 13 may be deformed towards the shaft (e.g. via a screwdriver) to inhibit the shaft from falling out of the slot thereafter.

Rollers 81 and 83 are more spaced-apart in the extended position of vehicle wheel mounting apparatus 20 seen in FIG. 12 and are closer together as the vehicle wheel mounting apparatus moves towards a more retracted position seen in FIG. 11.

As seen with reference to FIGS. 1 and 6, L-shaped members 22 and 24 each include longitudinally-extending portions 38 and 40 coupled to and extending perpendicular to laterally-extending portions 34 and 36 thereof. The longitudinally-extending and laterally-extending portions of the L-shaped members are substantially planar individually and relative to each other in this non-limiting example. Longitudinally-extending portions 38 and 40 of L-shaped members 22 and 24 are substantially rectangular in top and bottom profile in this example. Laterally-extending portions 34 and 36 of L-shaped members 22 and 24 are integrally connected to and formed with corresponding longitudinally-extending portions of the L-shaped members, respectively, so as to form a unitary whole in this example.

As seen in FIG. 1, longitudinally-extending portion 38 of L-shaped member 22 is co-planar with laterally-extending portion 34 of L-shaped member 24 in this example. As seen in FIG. 6, longitudinally-extending portion 40 of L-shaped member 24 is co-planar with laterally-extending portion 36 of L-shaped member 24 in this example.

As seen with reference to FIG. 12, longitudinally-extending portions 38 and 40 of L-shaped members 22 and 24 are shaped to selectively telescopically couple together. Longitudinally-extending portion 38 of L-shaped member 22 is shaped to nest at least in part within longitudinally-extending portion 40 of L-shaped member 24. However, this is not strictly required and in other embodiments longitudinally-extending portion 40 of L-shaped member 24 may be shaped to nest within longitudinally-extending portion 38 of L-shaped member 22. The L-shaped members have closed tops 26 and sides 30 and 32 and open bottoms 28 along the longitudinally-extending portions thereof. Longitudinally-extending portions 38 and 40 of L-shaped members 22 and 24 are channel-shaped in this example with open bottoms. The longitudinally-extending portions of L-shaped members are u-shaped in lateral cross-section in this example, in this case having an inverse u-shape.

As seen in FIG. 1, L-shaped member 22 includes at least one and in this example a plurality of stiffening members, in this example a first pair of spaced-apart stiffening members 48A and 48B which generally extend parallel to each other and a second pair of spaced-apart and parallel stiffening members 50A and 50B. As seen in FIG. 6, L-shaped member 24 includes at least one and in this example a plurality of stiffening members, in this case a first pair of spaced-apart stiffening members 56A and 56B which generally extend parallel to each other and a second pair of spaced-apart and parallel stiffening members 58A and 58B. Each stiffening member couples to and extends downwards from top 26 of a respective said L-shaped member in downward direction

91. Each stiffening member 48A, 48B, 50A, 50B, 56A, 56B, 58A and 58B is outwardly convex in part; however, this is not strictly required and each stiffening member may be substantially planar in other non-limiting embodiments. The stiffening members are in this example bent portions of L-shaped members 22 and 24. Stiffening members 48A, 48B, 50A, 50B, 56A, 56B, 58A and 58B may be referred to as downwardly bent peripheral portions of the L-shaped members. Each stiffening member is substantially rectangular in profile in this example; however, this is not strictly required. Stiffening members 48A, 48B, 50A, 50B, 56A, 56B, 58A and 58B are integrally connected to and formed with respective L-shaped members 22 and 24 so as to form a unitary whole in this example.

Referring to FIGS. 1 and 6, each stiffening member extends between a respective pair of the dolly wheels in this example: stiffening members 48A and 48B extend between casters 37 and 39, stiffening members 50A, 50B, 58A and 58B extend between casters 37 and 41, and stiffening members 56A and 56B extend between casters 41 and 43. Recessed regions of L-shaped members 22 and 24 are positioned between and adjacent respective stiffening members: as seen in FIG. 2, recessed regions 61 and 63 extends between stiffening members 48A and 50A; and as seen in FIG. 7, recessed regions 69 and 71 extend between stiffening members 56A and 58A.

Referring to FIG. 1, at least one and in this example a pair of spaced-apart stiffening members 50A and 50B couple to and extend outwards/downwards from longitudinally-extending portion 38 of L-shaped member 22. Referring to FIG. 6, at least one and in this example a pair of spaced-apart stiffening members 58A and 58B couple to and extend outwards/downwards from longitudinally-extending portion 40 of L-shaped member 24. As seen in FIG. 1, L-shaped member 22 includes a channel 62 formed by longitudinally-extending portion 38 and stiffening members 50A and 50B thereof. As seen in FIG. 6, L-shaped member 24 includes a channel 64 formed by longitudinally-extending portion 40 and stiffening members 58A and 58B thereof. Channels 62 and 64 are u-shaped or inverse u-shaped in lateral profile. The channels may be referred to as rails. For each L-shaped member the stiffening members coupled to and extending downwards from the longitudinally-extending portions thereof may be referred to as a first pair of spaced-apart bent portions which form channel.

Referring to FIG. 3, at least one and in this example a pair of stiffening members 48A and 48B couple to and extend outwards/downwards from laterally-extending portion 34 of L-shaped member 22. As seen in FIG. 3, L-shaped member 22 may thus be said to include a second channel 54 formed by laterally-extending portion 34 and stiffening members 48A and 48B thereof. Channel 54 is u-shaped or inverse u-shaped in lateral profile in this example and may function to increase stiffness of laterally-extending portion 34 of L-shaped member 22.

Figures 8, 9, 10:
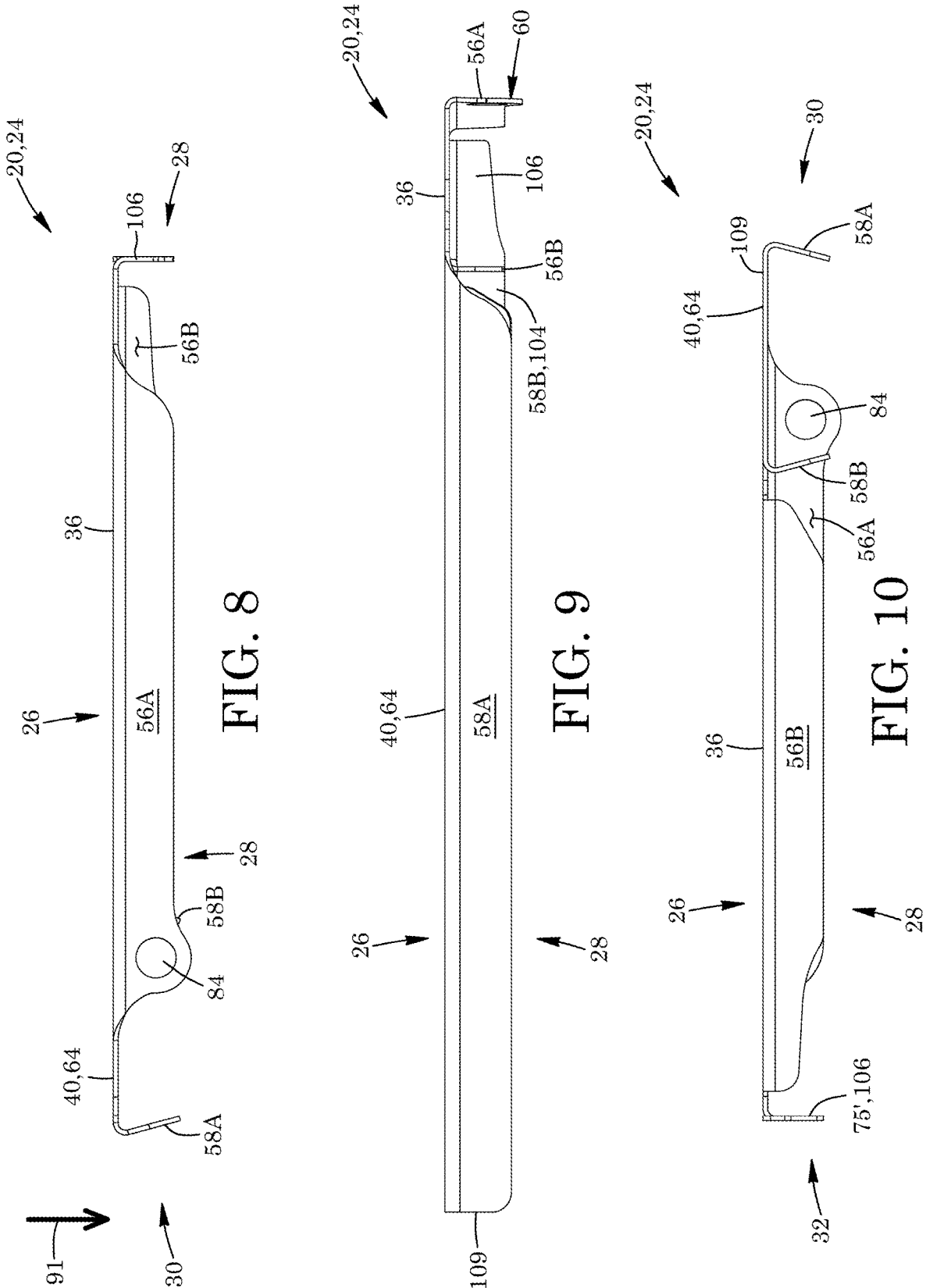
FIG. 8 is a first end elevation view of the second L-shaped member of FIG. 6.
FIG. 9 is an outer side elevation view of the second L-shaped member of FIG. 6.
FIG. 10 is a second end elevation view of the second L-shaped member of FIG. 6.

As seen in FIG. 8, at least one and in this example a pair of stiffening members 56A and 56B couple to and extend outwards/downwards from laterally-extending portion 36 of L-shaped member 24. As seen in FIG. 9, L-shaped member 24 may thus be said to include a second channel 60 formed by laterally-extending portion 36 and stiffening members 56A and 56B thereof. Channel 60 is u-shaped or inverse u-shaped in lateral profile in this example and may function to increase stiffness of laterally-extending portion 36 of L-shaped member 24. As seen in FIG. 12, channels 54 and 60 taper in direction 35; however, this is not strictly required.

As seen in FIGS. 1 and 6, roller mounts 73/73' and 75/75' may also function at least in part to stiffen L-shaped members 22 and 24, including laterally-extending portions 34 and 36 of the L-shaped members. The roller mounts may thus be referred to as a third pair of stiffening members.

Figure 12A:
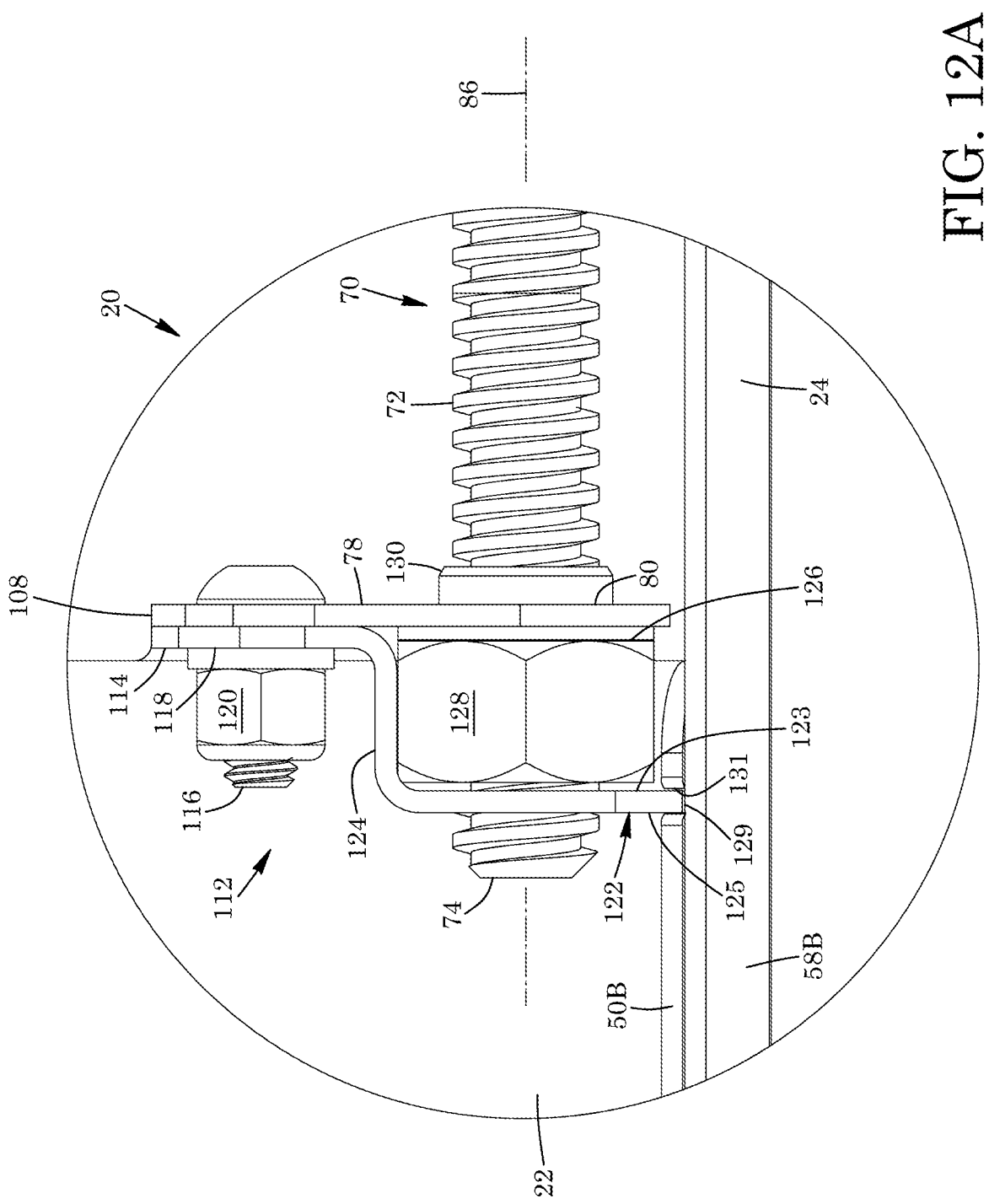
FIG. 12A is an enlarged view of portion A of the vehicle wheel mounting apparatus of FIG. 12.
Figure 12B:
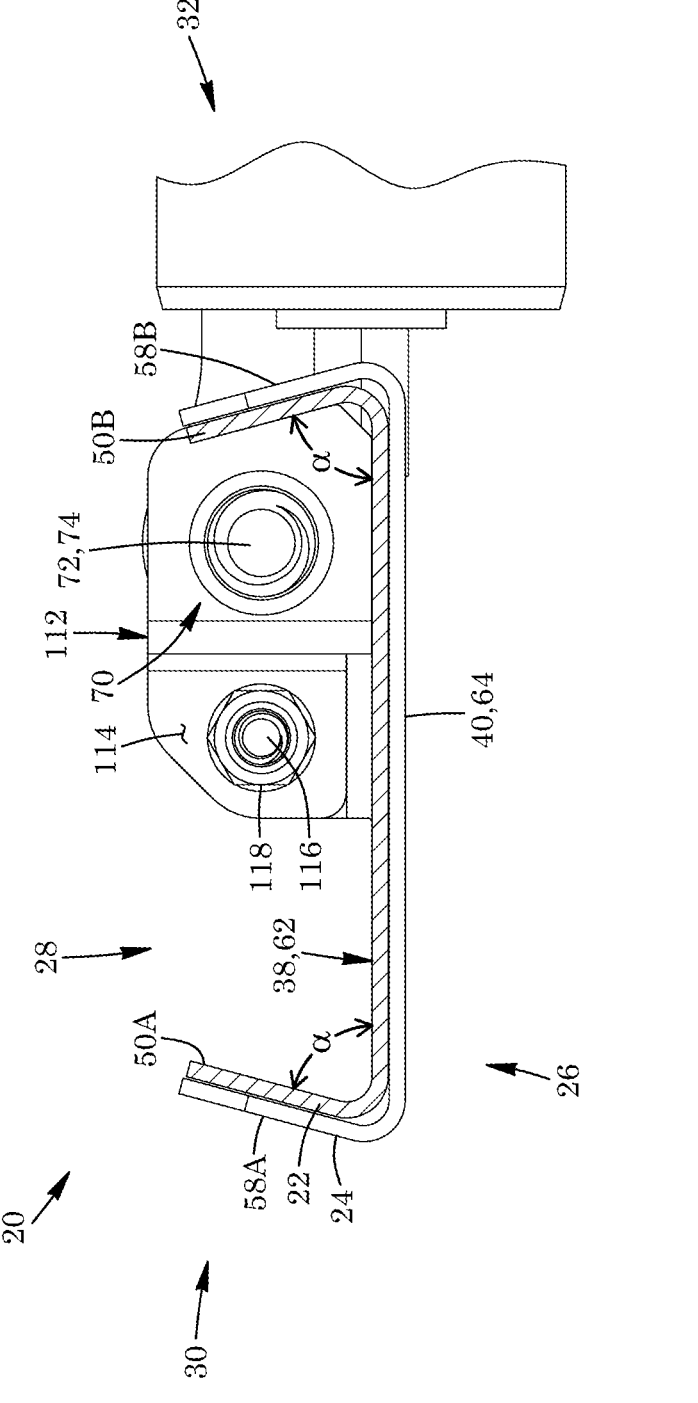
FIG. 12B is a sectional view taken along lines B-B of the vehicle wheel mounting apparatus of FIG. 12.
Figure 14:
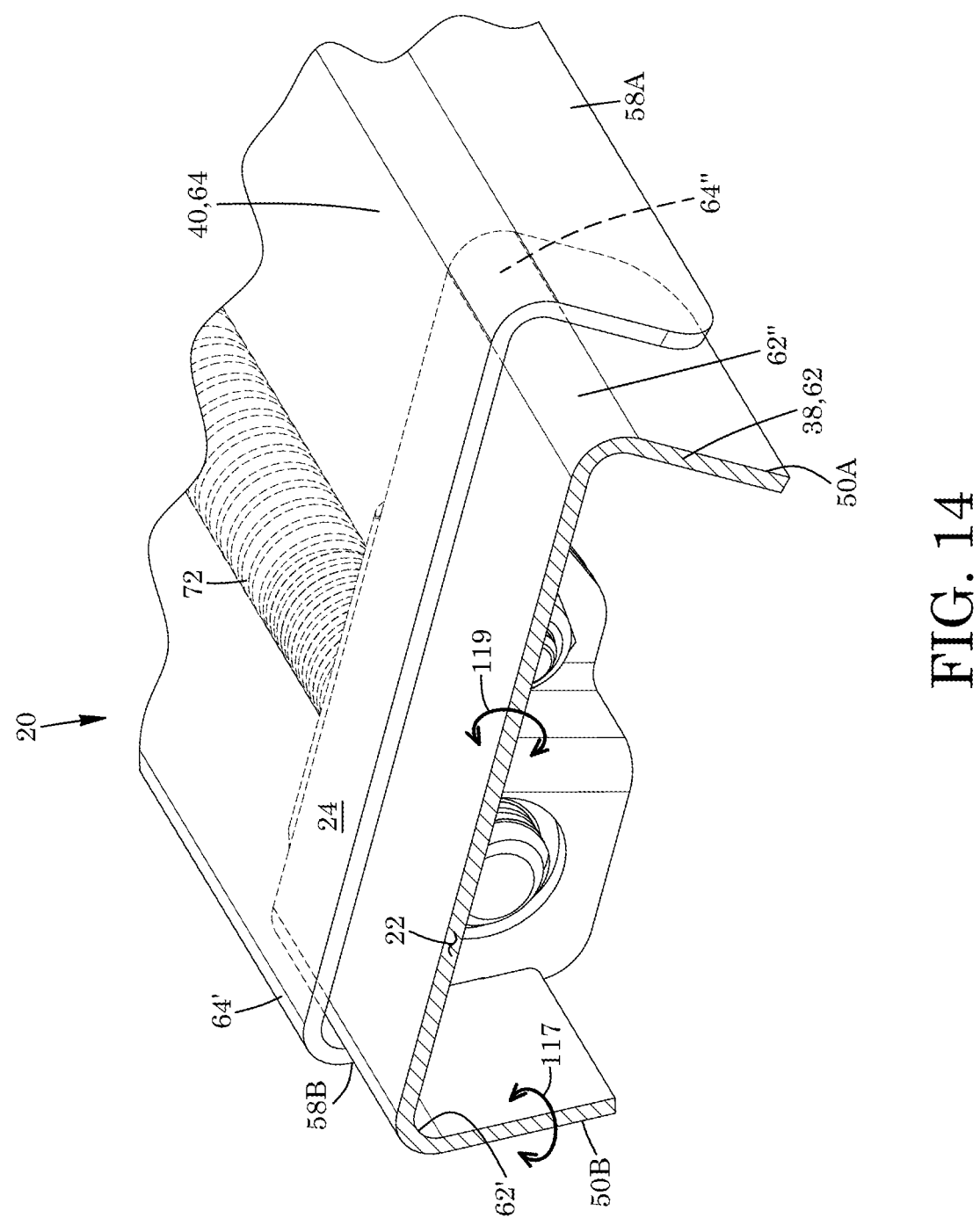
FIG. 14 is an enlarged lateral perspective view of channels of the vehicle wheel mounting apparatus of FIG. 11, with the apparatus shown in fragment and with an actuator of the vehicle wheel mounting apparatus of FIG. 6 shown partially in stippled lines.

As seen in FIG. 12B, stiffening members 58A and 58B are angled relative to longitudinally-extending portion 40 of L-shaped member 24 and stiffening members 50A and 50B are angled relative to longitudinally-extending portion 38 of L-shaped member 22 in each instance in this example by an angle α that is acute; however, this is not strictly required. Angle α is equal to 75 degrees in one non-limiting embodiment; however, this is likewise not strictly required. The stiffening members so angled with the 75 degree bend may enable guiding in both vertical and horizontal directions of channels 62 and 64. As seen in FIG. 14, channels 62 and 64 with acute angle bends 62'/62" and 64'/64" thereof is configured to guide/take bending moments in two planes/directions 117 and 119. The channels so shaped promote slidably coupling together of L-shaped members 22 and 24. As seen in FIG. 12B, stiffening members 50A, 50B, 58A and 58B may be referred to as peripheral portions of the channels that couple to and extend at acute angles relative to longitudinally-extending portions of the channels. In contrast, if channels 62 and 64 were u-shaped with stiffening members 50A, 50B, 58A and 58B extending outwards at 90 degrees, they may only provide guidance sideways/horizontally and may move apart vertically. In one non-limiting embodiment, the channels are thus acute angle u-shaped (or inverse acute angle u-shaped) in cross-section in order to provide guiding in two perpendicular planes and telescoping translation along the channels.

In one non-limiting embodiment, antifriction members (not shown) may be provided to facilitate telescopic movement between L-shaped members 22 and 24 and inhibit wear. The plurality of anti-friction members may be in the form of slide buttons (not shown) interposed between L-shaped members 22 and 24. The anti-friction members made of a plastic polymer material, such as a thermoplastic, e.g. Delrin®; however, this is not strictly require and only one or one set of anti-friction members may be provided in other non-limiting embodiments where the one or more anti-frictions members couple to a first of L-shaped members 22 and 24 and are slidable relative to a second of the L-shaped members. As a further variation as shown in the present embodiment, anti-friction members are not strictly required.

As seen in FIG. 6, vehicle wheel mounting apparatus 20 includes an actuator 70. The actuator may be referred to as a length-adjusting mechanism. Referring to FIGS. 12 and 12B, L-shaped members 22 and 24 are shaped to substantially enclose actuator 70 along top 26 and sides 30 and 32 thereof. The actuator is substantially positioned channel 64 when L-shaped members 22 and 24 are in the extended position seen in FIG. 12. Actuator 70 is substantially positioned within both channels 62 and 64 when the L-shaped members are in a fully retracted position of the L-shaped members. L-shaped members 22 and 24 are shaped to enable the actuator to be accessible via bottom 28 thereof. Actuator 70 so positioned and channels 62 and 64 so shaped may function to inhibit the actuator from being damaged on the one hand, while enabling the actuator to be selectively accessible on the other hand for inspection, maintenance, repairs and the like.

As seen in FIG. 12, the actuator includes an elongate male threaded member, in this example a threaded rod 72. The threaded rod may also be referred to as an elongate threaded member. Threaded rod 72 is substantially disposed within at least one of longitudinally-extending portions 38 and 40 of the L-shaped members. The threaded rod is substantially disposed within/below the longitudinally-extending portion of L-shaped member 24 seen in FIG. 12 in this example. Threaded rod 72 is substantially disposed within both longitudinally-extending portions 38 and 40 in a fully retracted position of the L-shaped members. The threaded rod has a first end portion 74 and a second end portion 76 spaced-apart from the first threaded end portion thereof.

The following is a non-limiting example of how actuator 70 may be coupled to L-shaped member 22. As seen in FIG. 1, the L-shaped member includes a tab 78 with an aperture 80 extending therethrough. The tab couples to and extends downwards from top 26 towards bottom 28 in direction 91. Tab 78 in this example comprises a bent portion of longitudinally-extending portion 38 of L-shaped member 22. The tab may function in part to stiffen of the longitudinally-extending portion of the L-shaped member and may thus be referred to as a further stiffening member. Stiffening members 50A and 50B extend perpendicular to tab 78 in this example.

As seen in FIG. 12, tab 78 extends perpendicular to threaded rod 72 in this example. The tab is positioned within longitudinally-extending portion 40 of L-shaped member 24. Tab 78 is enclosed by the top and sides of longitudinally-extending portion 40 of L-shaped member 24. The tab is shaped to extend between stiffening members 50A and 50B of L-shaped member 22 and is positioned between stiffening members 58A and 58B of L-shaped member 24 in this example. Tab 78 is selectively accessible via bottom 28 of longitudinally-extending portion 40 of L-shaped member 24.

As seen in FIG. 1, vehicle wheel mounting apparatus 20 includes a mount, in this example an actuator mount 112. The actuator mount may be referred to as an inner or second tab. Actuator mount 112 is generally Z-shaped in this non-limiting example. As seen in FIG. 12A, the actuator mount includes a first end portion 114. The first end portion of actuator mount 112 is rectangular in this example. First end portion 114 of the actuator mount couples to tab 78 via a fastener, in this example a screw 116 that extends through a second aperture 118 of the tab and is secured in place via a nut 120, in this example a nut. This is a regular/standard nut in this non-limiting example. Nut 120 so coupled to tab 78 may function to inhibit rotation of actuator mount 112 relative to tab 78. The actuator mount may function as a retainer for the nut as well as a push point for actuator 70 when selectively extending L-shaped members 22 and 24. Tab 78 may function as a pull point during retraction of the L-shaped members.

Referring to FIG. 12A, actuator mount 112 includes a second end portion 122 which couples to and in this non-limiting example extends parallel to first end portion 114. The second end portion of the actuator mount is rectangular in this non-limiting example. Second end portion 122 of actuator mount 112 is in this example integrally coupled to first end portion 114 of the actuator mount via a connecting portion 124 extending perpendicularly therebetween in this non-limiting embodiment. Still referring to FIG. 12A, the actuator mount so coupled to tab 78 is shaped to position the second end portion thereof parallel to and spaced-apart from the tab so as to form a space 126.

Actuator 70 includes a first female member, in this example a fastener, in this case a first nut 128 positioned within space 126. The first nut may be referred to as an actuator nut. Nut 128 is positioned between tab 78 and inner side 123 of second end portion 122 of actuator mount 112. The nut is "floating" between the tab and the retainer/actuator mount. Nut 128 is configured to threadably couple to and receive therethrough first end portion 74 of a threaded member, in this example threaded rod 72. Actuator mount 112 may thus be referred to as a nut retainer which abuts/mates with nut 128 and inhibits rotation of the nut.

Figure 15:
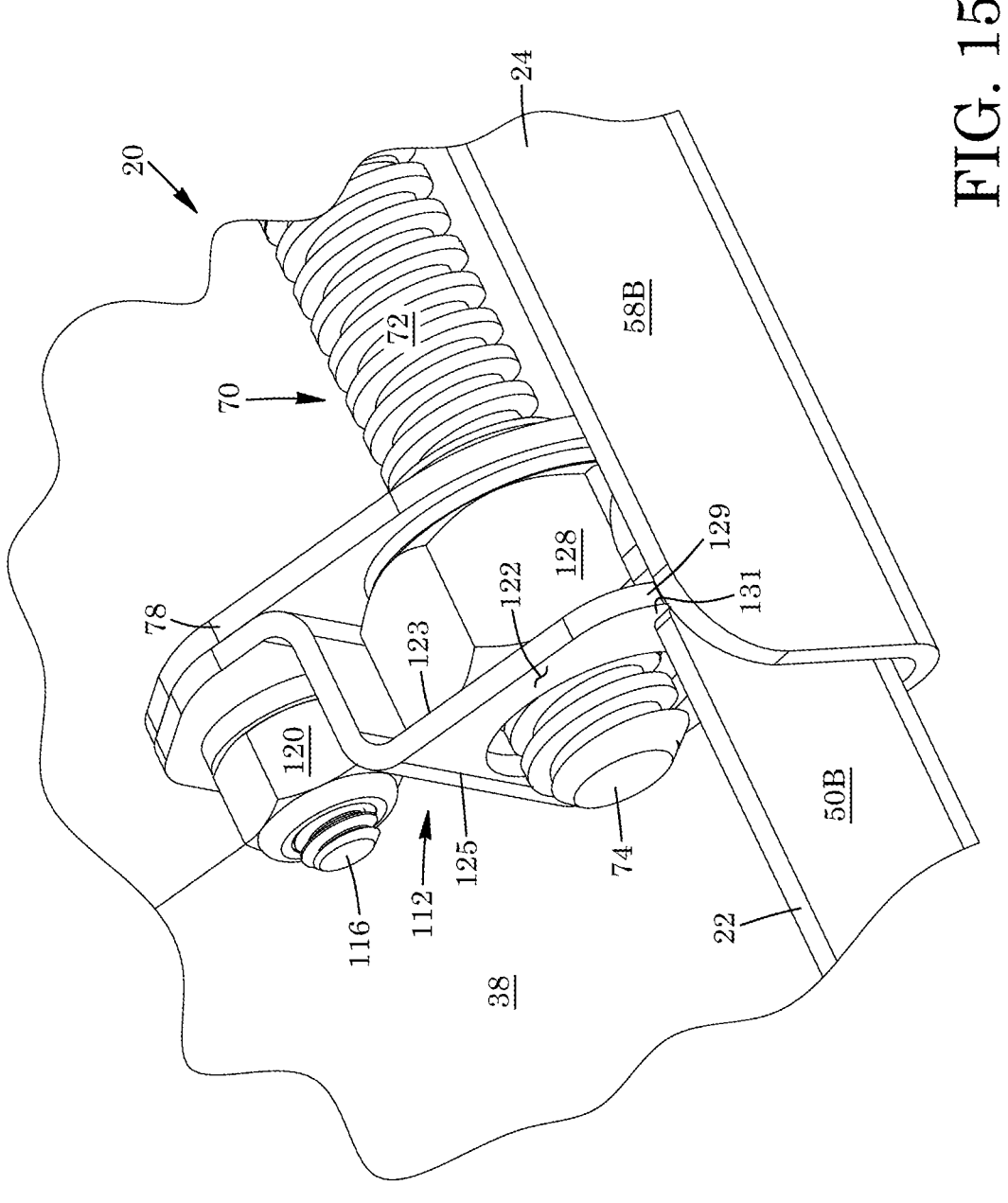
FIG. 15 is a bottom perspective view of the actuator mount of FIG. 12A, with the apparatus shown in fragment.

As seen in FIG. 15, second end portion 122 of actuator mount 112 has a distal end portion or free end 129 shaped to be received within a corresponding recess or channel slot 131 extending into or through stiffening member 50B of L-shaped member 22. The slot may be referred to as a channel slot, with the second end portion or lock tab of the actuator mount engaging with the channel slot to support the free end of the actuator mount during extension/pushing of L-shaped members 22 and 24 relative to tab 78.

As seen in FIG. 12A, actuator 70 includes a first non-rotating member, in this example a first sleeve bearing 130 adjacent to aperture 80 and nut 128. The first sleeve bearing is shaped to receive threaded rod 72 therethrough. First sleeve bearing 130 is configured to facilitate rotation of the threaded rod relative to tab 78.

Figure 16:
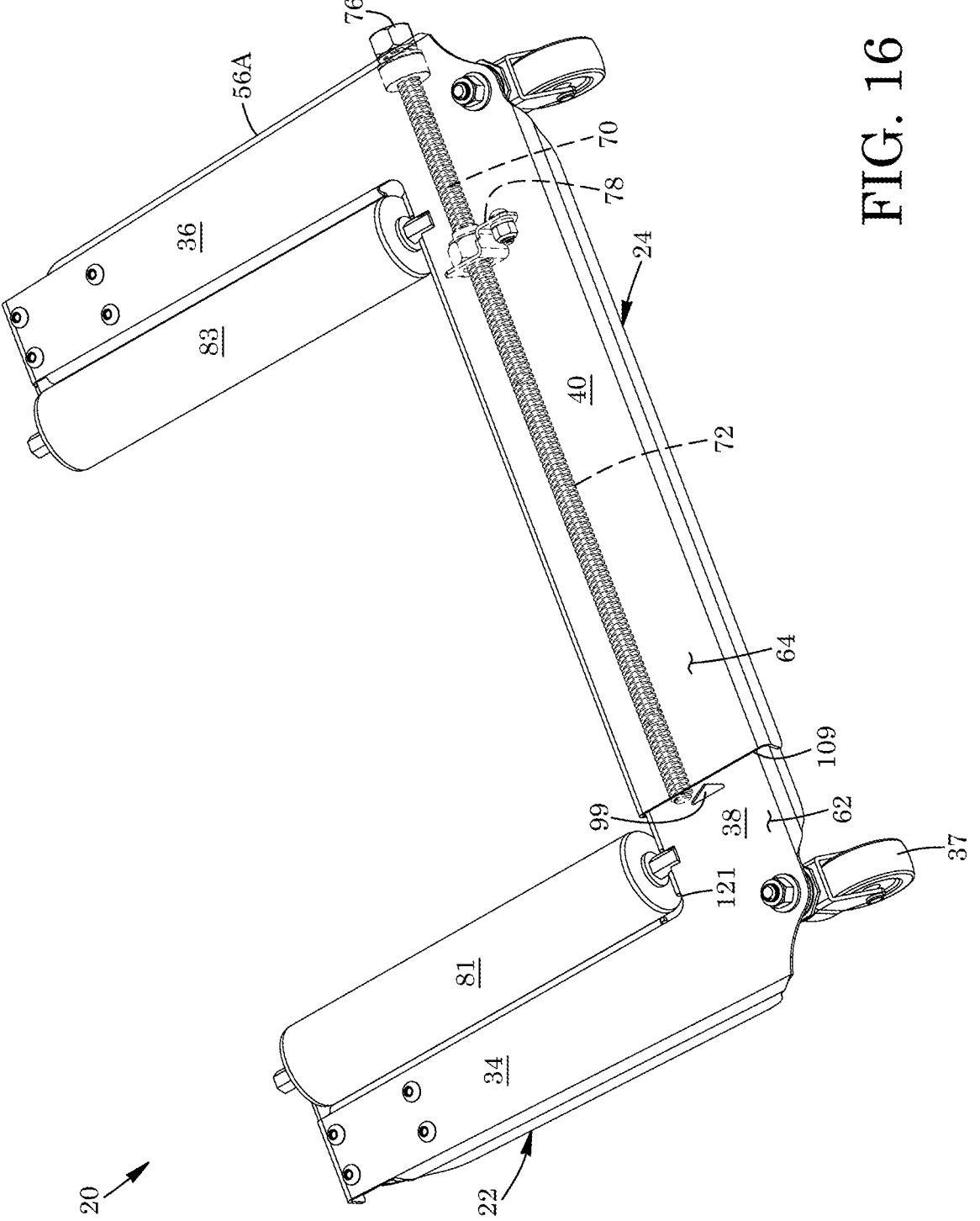
FIG. 16 is a top perspective view of the vehicle wheel mounting apparatus of FIG. 11 shown in a fully retracted position, with the apparatus shown in fragment and with the actuator of the vehicle wheel mounting apparatus of FIG. 11 shown in stippled lines.

Tab 78 and actuator mount 112 are positioned to substantially receive threaded rod 72 therethrough and be in this example adjacent roller 83 and relatively near/close-to second end portion 76 of the threaded rod in a fully retracted position of vehicle wheel mounting apparatus 20 seen in FIG. 16 in this non-limiting embodiment. However, the latter is not strictly required. Distal end portion 109 of longitudinally-extending portion 40 of L-shaped member 24 aligns with roller 81 and may be near or relatively close to laterally-extending portion 34 of L-shaped member 22 when the L-shaped members are in a fully retracted position in this non-limiting example.

Referring to FIG. 12, actuator 70 is configured such that second end portion 76 of threaded rod 72 is adjacent stiffening member 58A throughout movement of vehicle wheel mounting apparatus 20 from the extended position thereof seen in FIG. 12 to a fully retracted position thereof seen in FIG. 16 in this example. The actuator is thus configured to couple the second end portion of threaded rod 72 to L-shaped member 24 in a manner that enables rotation of the threaded rod while inhibiting longitudinal displacement of the threaded rod relative to the L-shaped member.

Figure 12C:
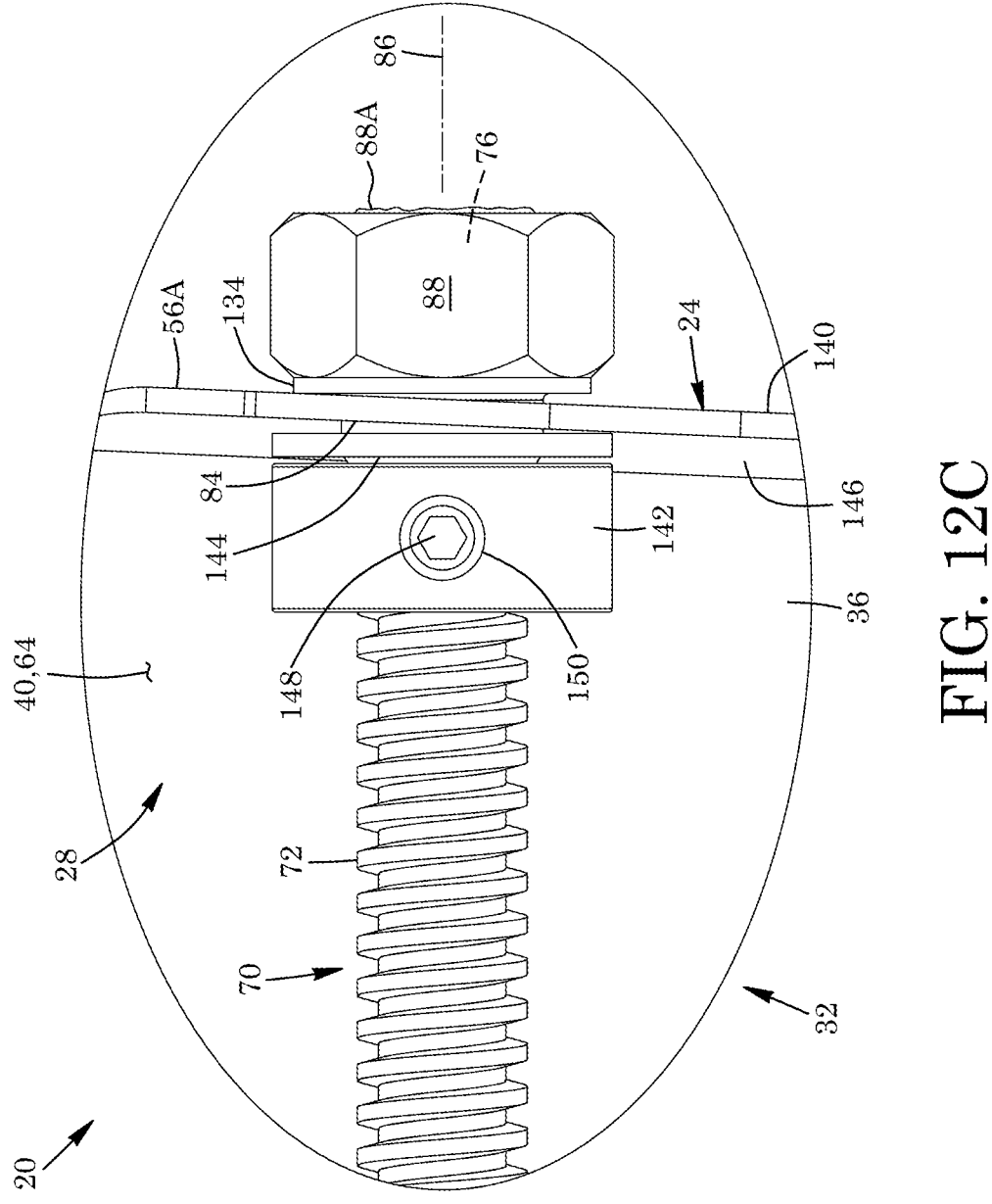
FIG. 12C is an enlarged view of portion C of the vehicle wheel mounting apparatus of FIG. 12.

The following is a non-limiting example of how actuator 70 may be coupled to L-shaped member 24. Referring to FIG. 12C, second end portion 76 of threaded rod 72 extends through an aperture 84 of stiffening member 56A. Apertures 80 and 84 seen in FIGS. 12A and 12C align with longitudinal axis 86 of threaded rod 72 and are coaxial in this example.

As seen in FIG. 12C, actuator 70 includes a first of a male and female fitting shaped to be selectively actuated via a second of the male and female fitting of a manually or powered tool (not shown) configured to selectively rotate the male threaded rod: in this example this occurs via an enlarged end portion in the form of a second female member or second nut 88 threadably coupled to second end portion 76 of threaded rod 72 and thereafter fixedly coupled thereto, in this non-limiting example via welding 88A. Alternatively, the threaded rod may be in the form of an elongate bolt, with the nut thus effectively being integrally connected to the rod and the second end portion being enlarged, for example. Nut 88 is configured to ensure that second end portion 76 of threaded rod 72 remains coupled to L-shaped member 24 and in this example adjacent to stiffening member 56A. As seen by FIGS. 12 and 16, aside from the nut and second end portion of the threaded rod, actuator 70 is substantially enclosed along top 26 and sides 30 and 32 thereof by at least longitudinally-extending portion 40 of L-shaped member 24 through the range of motion of vehicle wheel mounting apparatus 20. Aside from nut 88 and second end portion 76 of threaded rod 72, the actuator is also substantially enclosed along the top and sides of longitudinally-extending portion 38 of L-shaped member 22 in a fully retracted position of the vehicle wheel mounting apparatus.

Referring to FIG. 12C, actuator 70 is configured to couple second end portion 76 of threaded rod 72 to L-shaped member 24 in a manner that enables rotation of the threaded rod while inhibiting longitudinal displacement of the threaded rod relative to the L-shaped member. The following is a non-limiting example an arrangement which enables the above functionality. Actuator 70 includes a second non-rotating member, in this example a second sleeve bearing 134 adjacent to aperture 84 and nut 88 and shaped to receive second end portion 76 of threaded rod 72. The sleeve bearing is configured to facilitate rotation of the threaded rod relative to stiffening member 56A of second L-shaped member 24.

Nut 88 is in this example fixedly coupled to threaded rod 72. In one non-limiting example to this end, an elongate member or pin (not shown, e.g. slotted spring pin) may extend through a laterally-extending aperture (not shown) of the nut and into and/or abuts the threaded rod thereafter, thereby inhibiting rotation of the nut relative to the threaded rod thereafter. However, this is not strictly required and the nut may fixedly couple to the threaded rod in other manners in other examples. Nut 88 (via sleeve bearing 134) abuts outer side 140 of stiffening member 56A.

Still referring to FIG. 12C, actuator 70 in this example includes a third female member, in this case a set-screwed collar 142; however, this is not strictly required and a nut may be provided in other embodiments for example. A washer 144 in this non-limiting example is positioned between the collar and inner side 146 of stiffening member 56A. Collar 142 is in this example fixedly coupled to threaded rod 72 adjacent second end portion 76 of threaded rod 72: in this case via an elongate member set screw 148 extending through a laterally-extending aperture 150 of the nut and into and/or abutting the threaded rod thereafter; in other non-limiting embodiments a pin, such as a slotted spring pin may be provided instead of a set screw.

Actuator 70 so mounted, with its nuts 88 and collar 142 so coupled to second end portion 76 of threaded rod 72 on either side of stiffening member 56A of L-shaped member 24, and sleeve bearing 134 positioned therebetween, enables the threaded rod to be selectively rotated in directions 92 and 98 seen in FIG. 11 to selectively extend or retract L-shaped members 22 and 24 relative to each other, while inhibiting longitudinal movement/displacement of the threaded rod relative to the L-shaped member 24. Set-screwed collar 142 captures the threaded nut on the drive nut side in this non-limiting embodiment. Longitudinally-extending portion 38 of L-shaped member 22 seen in FIG. 16 may include one or more stoppers 99 shaped to abut distal end portion 109 of L-shaped member 24 thereby inhibit further retraction therepast. The stopper may be a bent portion of L-shaped member 22 in this non-limiting example.

In operation and referring to FIG. 11, rollers 81 and 83 are configured to receive therebetween a vehicle wheel 90. Rotation of nut 88 in a first direction of rotation, in this example a clockwise direction as seen by arrow 92, causes threaded rod 72 to engage with nut 88 opposite tab 78 seen in FIG. 12A and selectively retract longitudinally-extending portion 38 of L-shaped member 22 into longitudinally-extending portion 40 of L-shaped member 24. Actuator 70 is thus configured to enable the L-shaped members to move from the extended position seen in FIG. 12 to a fully retracted position seen in FIG. 16. Rollers 81 and 83 selectively move closer together as vehicle wheel mounting apparatus 20 moves from the extended position thereof seen in FIG. 12 towards a more retracted position thereof. Moving the rollers to an intermediate position between the extended and retracted positions of the vehicle wheel mounting apparatus causes vehicle wheel 90 seen in FIG. 11 to be supported by rollers 81 and 83 spaced upwards from ground 94. Vehicle wheel mounting apparatus 20 may then be used to transport the vehicle wheel to a vehicle whose wheel/tire needs replacing. The primary use of the vehicle wheel mounting apparatus may be to change winter tires for summer tires (and vice versa) both of which are mounted on rims.

When vehicle wheel 90 seen in FIG. 11 is positioned adjacent to a wheel hub assembly (not shown) of the vehicle (not shown) whose wheel/tire needs replacing, actuator 70 is actuated once more by in this example further rotating nut 88 seen in FIG. 12C in the clockwise direction as seen by arrow 92 in FIG. 11. This causes rollers 81 and 83 to move yet closer to each other, which causes vehicle wheel 90 to be selectively raised upwards as shown by arrow 96 until the vehicle wheel aligns with the wheel hub assembly for mounting the vehicle wheel thereto. Vehicle wheel mounting apparatus 20 may thus facilitate replacement/changing of the wheel/tire.

The vehicle wheel mounting apparatus may also be used to remove a wheel/tire that needs replacing/changing by following the above steps in reverse. As seen in FIG. 11, selective actuation of actuator via nut 88 in a second direction of rotation opposite the first direction of rotation, in this case a counter-clockwise direction 98, causes vehicle wheel mounting apparatus 20 to move from a retracted position thereof towards the extended position thereof.

Still referring to FIG. 11, there is also provided a method of manufacturing vehicle wheel mounting apparatus 20. The method includes forming a pair of L-shaped blanks 23 and 25 seen in FIGS. 2 and 7. Blank 23 seen in FIG. 2 comprise laterally-extending portion 34 and longitudinally-extending portion 38. Blank 25 seen in FIG. 7 comprise laterally-extending portion 36 and longitudinally-extending portion 40. The method may include forming the L-shaped blanks using sheet metal, which may in this example comprise cutting the blanks generally into L-shaped patterns in top/bottom profile. The method may include in this example laser cutting sheet metal into L-shapes; however, this is not strictly required and the sheet metal may be cut or formed into shape in other manners in other embodiments. The sheet metal may comprise sheet steel; however, this is not strictly required and other materials may be used in other embodiments.

Referring to FIGS. 1 and 6, the method may include rotatably coupling spaced-apart wheels 47 to the bottoms of the blanks at, adjacent or near corners 49, 51, 53 and 55 thereof.

Still referring to FIGS. 1 and 6, the method may then include after the forming the L-shaped blanks step, shaping L-shaped blanks 23 and 25. The roller mounts may be formed via brake forming; however, this is not strictly required and the L-shaped blanks may be formed in other manners in other embodiments. The method includes forming a pair of roller mounts 73 and 75 by bending spaced-apart end portions 100/102 and 104/106 adjacent laterally-extending portions 34 and 36 of blanks 23 and 25 in downward direction 91. End portions 102 and 106 span the widths of and extend outwards from the laterally-extending portions of the blanks in this non-limiting example. This may function to further stiffen laterally-extending portions 34 and 36 of L-shaped members 22 and 24; however, this is not strictly required and end portions 102 and 106 may comprise other sizes relative to end portions 100 and 104 in other embodiments. As seen in FIGS. 1 and 6, slots 79' of distal or outer end portions 102 and 106 of roller mounts 73' and 75' are laterally inwardly spaced from laterally-extending portions 34 and 36 of L-shaped members 22 and 24 in this example.

The method includes rotatably coupling rollers 81 and 83 to the roller mounts. The method may include forming or cutting recessed regions 61/63, 65, 67, and 69/71 adjacent corners 49, 51, 53 and 55 of blanks 23 and 25, to facilitate subsequent the bending steps.

Referring to FIGS. 1 and 6, the method may in this example include bending in downward direction 91 sides of the laterally-extending portions. This may function to form stiffening members 48A, 48B, 50A, 50B, 56A, 56B, 58A and 58B and may be achieved by brake forming in this example, though this is not strictly required. In each instance forming/bending end portions 100/104 and corresponding stiffening member 50B and 58B may comprise the same steps, respectively.

Referring to FIGS. 1 and 6, the method includes forming a pair of telescoping channels 62 and 64 by bending sides 30 and 32 of longitudinally-extending portions 38 and 40 of blanks 23 and 25 in downward direction 91. The method may include forming the channels such that for each channel, a first peripheral portion thereof extends at an acute angle relative to the longitudinally-extending portion of the L-shaped member and a second peripheral portion extends at an acute angle relative to the longitudinally-extending portion of the L-shaped member.

The method may include forming one channel 62 by bending distal end 108 of longitudinally-extending portion 38 of blank 23 in downward direction 91. The channels may be formed by brake forming, though this is not strictly required. In one non-limiting embodiment, L-shaped members 22 and 24 as herein described are thus each made of one piece of sheet metal, in this case sheet steel, which is laser cut and brake formed, with no welding required.

Referring to FIG. 12, the method includes positioning a length adjustment mechanism, in this case, actuator 70 comprising threaded rod 72, substantially within at least channel 64 throughout the range of motion of vehicle wheel mounting apparatus 20. As seen in FIG. 12A, the method may include threadably coupling nut 128 to threaded rod 72 adjacent distal end 108 of channel 62. The method may include so coupling threaded end portion 74 of threaded rod 72 to distal end 108 of longitudinally-extending portion 38 of blank 23 so bent.

As seen in FIG. 12C, the method include bushing the threaded rod to proximal end 110 of channel 64. The method may include bushing threaded rod 72 to the proximal end of longitudinally-extending portion 40 of blank 25 adjacent a bit-engaging end or second end portion 76 of threaded rod 72. Actuation of the threaded rod selectively adjusts spacing between rollers 81 and 83 from a retracted position of vehicle wheel mounting apparatus 20 seen in FIG. 11 to the extended position of the vehicle wheel mounting apparatus seen in FIG. 12.

The method may include positioning vehicle wheel 90 seen in FIG. 11 between rollers 81 and 83 and selectively moving the rollers closer to each other via actuator 70. The method may include moving the rollers partially towards each other by actuating the actuator in a first instance, with the vehicle wheel being supported by the rollers thereby.

In addition or alternatively, the method include moving rollers 81 and 83 to a first position via actuator 70 to carry vehicle wheel 90 thereon. The method may include positioning/moving (as seen by arrow 107 in FIG. 17) the vehicle wheel adjacent to a wheel hub assembly (not shown) in need of tire/wheel replacement. As seen in FIG. 11, the method may include elevating (as seen by arrow 96) vehicle wheel 90 towards the wheel hub assembly by moving rollers 81 and 83 to a second position in which the rollers are closer to each other relative to the first position.

Figure 17:
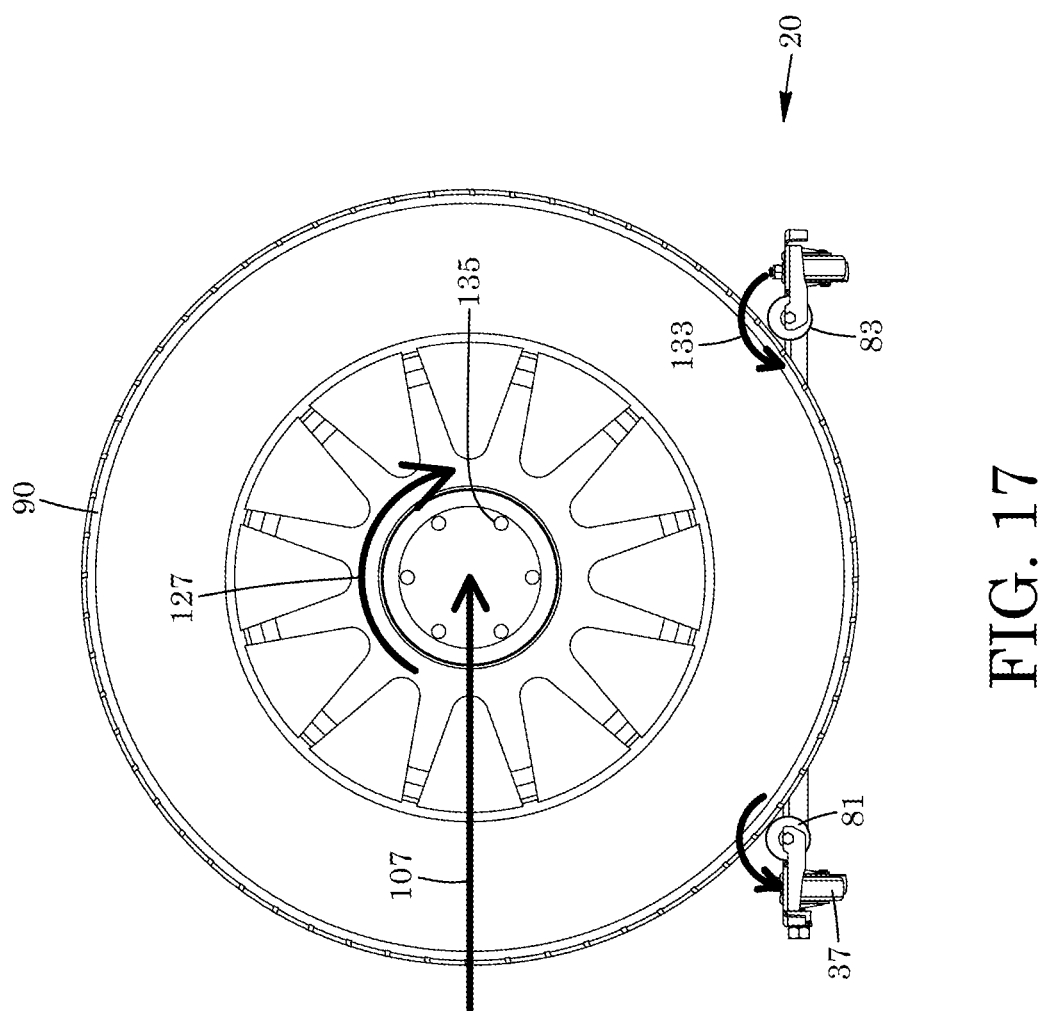
FIG. 17 is a side elevation view of the vehicle wheel and vehicle wheel mounting apparatus of FIG. 11, with the vehicle wheel mounting apparatus shown in its fully retracted position.

The method may include raising vehicle wheel 90 towards a wheel hub assembly (not shown) by moving rollers 81 and 83 further towards each other by further actuating actuator 70 in a second instance. The method may thus include selectively elevating the vehicle wheel via vehicle wheel mounting apparatus 20. The method may include matching the height of the vehicle wheel with a hub center of the vehicle. As seen in FIG. 17, the method may thereafter include rotating vehicle wheel 90 (as seen by first direction of rotation 127) via rollers 81 and 83 (as seen by second direction of rotation 133 opposite the first direction of rotation) to align lug holes 135 of the vehicle wheel to the hub studs (not shown).

It will be appreciated that many variations are possible within the scope of the invention described herein. For example, as seen in FIG. 15, actuator 70 may include a distal fastener, in this example a first push nut (not shown, e.g. push nut fastener, a push-on fastener and/or Palnut® fastener) coupled to first end portion 74 of threaded rod 72 on outer side 125 of second end portion 122 of actuator mount 112. Referring to FIG. 12, actuator 70 may include a stopper, in this example in the form of a second fastener, in this case a second push nut (not shown) threadably coupled to threaded rod 72 at a location spaced from the first push nut. The second push nut may be positioned such that distal end portion 109 of L-shaped member 24 is adjacent, aligned with or relatively near roller 81, inner end 154 of stiffening member 50B of L-shaped member 22, and/or laterally-extending portion 34 of L-shaped member 22, when the L-shaped members are fully retracted. The second push nut may threadably couple to threaded rod 72 and may be configured to selectively inhibit longitudinal displacement of the second push nut relative to the threaded rod upon the second push nut being positioned in a desired location. Referring to FIG. 16, the second push nut may be positioned to abut tab 78 and/or sleeve bearing 130 seen in FIG. 12A when vehicle wheel mounting apparatus 20 is fully retracted, thereby inhibiting further retraction of L-shaped member 22 relative to L-shaped member 24. In this variation the role of the push nuts may be to function as end of stroke stops or bumpers. The push nuts in this non-illustrated embodiment may function to inhibit rotation of threaded rod 72 past a fully retracted position of L-shaped members 22 and 24 without adding bending stresses to the actuator tabs: if actuator 70 is operated via a power drill, the torque limiter of the drill will engage. The first push nut may function as a stop when bringing together rollers 81 and which may also inhibit a pinch-point at inside corner 121 of L-shaped member 22 where the coming together of channels 62 and 64 of L-shaped members 22 and 24 in the fully retracted position thereof may otherwise result in a pinching of one's fingers. The second push nut may be selectively adjusted or rotated to adjust the extent to which the L-shaped members fully retracted. Referring to FIG. 12, the push nuts in this variation may thus function to limit the stroke of actuator 70 to prevent bending the support tabs in the closed position and disengagement at the fully open position. However, push nuts are not strictly required and are not provided in the illustrated embodiment.

Where a component (e.g. a member, apparatus, assembly etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms. These terms ("a", "an", and "the") mean one or more unless stated otherwise;

"and/or" is used to indicate one or both stated cases may occur, for example A and/or B includes both (A and B) and (A or B);

"approximately" when applied to a numerical value means the numerical value±10%;

where a feature is described as being "optional" or "optionally" present or described as being present "in some embodiments" it is intended that the present disclosure encompasses embodiments where that feature is present and other embodiments where that feature is not necessarily present and other embodiments where that feature is excluded. Further, where any combination of features is described in this application this statement is intended to serve as antecedent basis for the use of exclusive terminology such as "solely," "only" and the like in relation to the combination of features as well as the use of "negative" limitation(s)" to exclude the presence of other features; and "first" and "second" are used for descriptive purposes and cannot be understood as indicating or implying relative importance or indicating the number of indicated technical features.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by "about". In this context, "about" provides literal support for the exact numerical value that it precedes, the exact numerical value ±5%, as well as all other numerical values that are near to or approximately equal to that numerical value. Unless otherwise indicated a particular numerical value is included in "about" a specifically recited numerical value where the particular numerical value provides the substantial equivalent of the specifically recited numerical value in the context in which the specifically recited numerical value is presented. For example, a statement that something has the numerical value of "about 10" is to be interpreted as: the set of statements:

in some embodiments the numerical value is 10;

in some embodiments the numerical value is in the range of 9.5 to 10.5;

and if from the context the person of ordinary skill in the art would understand that values within a certain range are substantially equivalent to 10 because the values with the range would be understood to provide substantially the same result as the value 10 then "about 10" also includes:

in some embodiments the numerical value is in the range of C to D where C and D are respectively lower and upper endpoints of the range that encompasses all of those values that provide a substantial equivalent to the value 10

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Any recited method can be carried out in the order of events recited or in any other order which is logically possible. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, simultaneously or at different times.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible). This is the case even if features A and B are illustrated in different drawings and/or mentioned in different paragraphs, sections or sentences.

ADDITIONAL DESCRIPTION

Examples of wheel dollies have been described. The following clauses are offered as further description.

(1) A vehicle wheel mounting apparatus comprising: first and second L-shaped members which telescopically couple together; and rollers rotatably coupled to the L-shaped members.

(2) A vehicle wheel mounting apparatus according to clause 1, or any preceding or subsequent clause, wherein the rollers are configured to receive therebetween and selectively elevate a vehicle wheel.

(3) A vehicle wheel mounting apparatus according to any one of clauses 1 to 2, or any preceding or subsequent clause, wherein each said L-shaped member is substantially planar.

(4) A vehicle wheel mounting apparatus according to any one of clauses 1 to 3, or any preceding or subsequent clause, wherein each said L-shaped member is made of sheet metal.

(5) A vehicle wheel mounting apparatus according to any one of clauses 1 to 4, or any preceding or subsequent clause, including dolly wheels rotatably coupled to the first and second L-shaped members.

(6) A vehicle wheel mounting apparatus according to any one of clauses 1 to 4, or any preceding or subsequent clause, including one or more stiffening members extending along a periphery of the L-shaped members.

(7) A vehicle wheel mounting apparatus according to clause 5, or any preceding or subsequent clause, including one or more stiffening members extending along a periphery of the L-shaped members, with each said stiffening member extending between a respective pair of said dolly wheels.

(8) A vehicle wheel mounting apparatus according to clause 7, or any preceding or subsequent clause, wherein each said L-shaped member has a recessed region between adjacent said stiffening members, with each said recessed region facilitating rotation of a respective said dolly wheel.

(9) A vehicle wheel mounting apparatus according to any one of clauses 6 to 8, or any preceding or subsequent clause, wherein each said L-shaped member has a top and a bottom spaced-apart from the top thereof and wherein each said stiffening member couples to and extends downwards from the bottom of a respective said L-shaped member.

(10) A vehicle wheel mounting apparatus according to any one of clauses 6 to 9, or any preceding or subsequent clause, wherein each said stiffening member is substantially a rectangular in profile.

(11) A vehicle wheel mounting apparatus according to any one of clauses 6 to 10, or any preceding or subsequent clause, wherein each said stiffening member is outwardly convex in part.

(12) A vehicle wheel mounting apparatus according to any one of clauses 6 to 11, or any preceding or subsequent clause, wherein the stiffening members are integrally connected to and formed with respective said L-shaped members so as to form a unitary whole.

(13) A vehicle wheel mounting apparatus according to any one of clauses 6 to 12, or any preceding or subsequent clause, wherein the one or more stiffening members are bent portions of the L-shaped members.

(14) A vehicle wheel mounting apparatus according to any one of clauses 1 to 13, or any preceding or subsequent clause, including a pair of roller mounts, each said roller mount coupling to a respective said L-shaped member and being shaped to receive and rotatably couple to a respective said roller.

(15) A vehicle wheel mounting apparatus according to clause 14, or any preceding or subsequent clause, wherein each said roller mount couples to and extends downwards from the top of a respective said L-shaped member.

(16) A vehicle wheel mounting apparatus according to any one of clauses 14 to 15, or any preceding or subsequent clause, wherein each said roller mount comprises an L-shaped bracket.

(17) A vehicle wheel mounting apparatus according to any one of clauses 14 to 16, wherein each said roller mount is outwardly convex in part.

(18) A vehicle wheel mounting apparatus according to any one of clauses 14 to 17, wherein each said roller mount is integrally connected to and formed with respective said L-shaped members so as to form a unitary whole.

(19) A vehicle wheel mounting apparatus according to any one of clauses 14 to 18, or any preceding or subsequent clause, wherein the roller mounts comprise bent portions of the L-shaped members.

(20) A vehicle wheel mounting apparatus according to any one of clauses 1 to 19, or any preceding or subsequent clause, wherein each said L-shaped member includes a laterally-extending portion.

(21) A vehicle wheel mounting apparatus according to any one of clauses 6 to 13, or any preceding or subsequent clause, wherein each said L-shaped member includes a laterally-extending portion, with at least one said stiffening member coupling to and extending outwards from each said laterally-extending portion.

(22) A vehicle wheel mounting apparatus according to any one of clauses 14 to 19, or any preceding or subsequent clause, wherein each said L-shaped member includes a laterally-extending portion, with the roller mounts coupling to and extending outwards from the laterally-extending portions of the L-shaped members.

(23) A vehicle wheel mounting apparatus according to any one of clauses 20 to 22, or any preceding or subsequent clause, wherein the laterally-extending portions of the L-shaped members extend generally parallel with each other.

(24) A vehicle wheel mounting apparatus according to any one of clauses 20 to 23, or any preceding or subsequent clause, wherein each said L-shaped member includes a longitudinally-extending portion coupled to and extending perpendicular to the laterally-extending portion thereof

(25) A vehicle wheel mounting apparatus according to clause 24, or any preceding or subsequent clause, wherein for each said L-shaped member the laterally-extending portion thereof is integrally connected to and formed with the longitudinally-extending portion thereof so as to form a unitary whole.

(26) A vehicle wheel mounting apparatus according to any one of clauses 6 to 13, or any preceding or subsequent clause, wherein each said L-shaped member includes a longitudinally-extending portion, with at least one said stiffening member coupling to and extending outwards from each said longitudinally-extending portion.

(27) A vehicle wheel mounting apparatus according to any one of clauses 6 to 13, or any preceding or subsequent clause, wherein each said L-shaped member includes a longitudinally-extending portion, with a pair of spaced-apart said stiffening members coupling to and extending outwards from each said longitudinally-extending portion.

(28) A vehicle wheel mounting apparatus according to any one of clauses 24 to 27, or any preceding or subsequent clause, wherein the longitudinally-extending portions of the L-shaped members telescopically couple together.

(29) A vehicle wheel mounting apparatus according to any one of clauses 24 to 28, or any preceding or subsequent clause, wherein the longitudinally-extending portion of a first said L-shaped member is shaped to nest with the longitudinally-extending portion of a second said L-shaped member.

(30) A vehicle wheel mounting apparatus according to any one of clauses 24 to 29, or any preceding or subsequent clause, wherein the longitudinally-extending portions of the L-shaped members are channel-shaped.

(31) A vehicle wheel mounting apparatus according to any one of clauses 24 to 30, or any preceding or subsequent clause, wherein the longitudinally-extending portions of the L-shaped members are u-shaped or inverse u-shaped in lateral cross-section.

(32) A vehicle wheel mounting apparatus according to any one of clauses 24 to 31, or any preceding or subsequent clause, wherein the L-shaped members have closed tops and sides and open bottoms along the longitudinally-extending portions thereof

(33) A vehicle wheel mounting apparatus according to any one of clauses 1 to 32, or any preceding or subsequent clause, including an actuator configured to enable the L-shaped members to move from a retracted position to an extended position, with the rollers being closer together in the retracted position and more spaced-apart in the extended position.

(34) A vehicle wheel mounting apparatus according to clause 33, or any preceding or subsequent clause, wherein the L-shaped members are shaped to substantially enclose the actuator along the top and sides thereof and enable the actuator to be accessible via the bottom thereof

(35) A vehicle wheel mounting apparatus according to any one of clauses 33 to 34, or any preceding or subsequent clause, wherein the actuator comprises an elongate threaded member with a first end portion threadably coupling to a first of the L-shaped members and a second end portion threadably coupled to a second of the L-shaped members.

(36) A vehicle wheel mounting apparatus according to clause 35, or any preceding or subsequent clause, wherein the second end portion of the elongated threaded member comprises a first of a male and female fitting shaped to be selectively actuated via a second of the male and female fitting of a manually or powered tool configured to selectively rotate the threaded member.

(37) A vehicle wheel mounting apparatus according to any one of clauses 24 to 32, or any preceding or subsequent clause, including an elongate threaded member substantially disposed within at least one of the longitudinally-extending portions of the L-shaped members.

(38) A vehicle wheel mounting apparatus according to clause 37, or any preceding or subsequent clause, including a female threaded member positioned within the longitudinally-extending portions of the L-shaped members and shaped to threadably couple with the elongate threaded member.

(39) A vehicle wheel mounting apparatus according to clause 38, or any preceding or subsequent clause, where in the female threaded member is a bent portion of one said longitudinally-extending portions of the L-shaped members.

(40) A vehicle wheel mounting apparatus according to any one of clauses 37 to 39, or any preceding or subsequent clause, wherein the longitudinally-extending portion of one said L-shaped member is shaped to threadably couple to a threaded end portion of the elongate threaded member and the longitudinally-extending portion of another said L-shaped member is shaped to threadably couple to the elongate threaded member adjacent an enlarged end portion of the elongate threaded member.

(41) A vehicle wheel mounting apparatus according to any one of clauses 1 to 41, or any subsequent or preceding clause, including one or more antifriction members interposed between the L-shaped members.

(42) A vehicle wheel mounting apparatus according to clause 41, or any preceding or subsequent clause, wherein each said antifriction member is configured to facilitate telescopic movement between the L-shaped members.

(43) A vehicle wheel mounting apparatus according to any one of clauses 41 to 42, or any preceding or subsequent clause, wherein each said antifriction member is configured to promote sliding of a first said L-shaped member relative to a second said L-shaped member.

(44) A vehicle wheel mounting apparatus according to any one of clauses 41 to 43, or any preceding or subsequent clause, wherein each said antifriction member selectively adheres to a respective said L-shaped member.

(45) A vehicle wheel mounting apparatus according to any one of clauses 41 to 44, or any preceding or subsequent clause, wherein each said antifriction member is circular in shape.

(46) A vehicle wheel mounting apparatus according to any one of clauses 41 to 45, or any subsequent or preceding clause, wherein each said antifriction member couples to a respective longitudinally-extending portions of the L-shaped members.

(47) A vehicle wheel mounting apparatus according to any one of clauses 41 to 46, or any subsequent or preceding clause, wherein the one or more antifriction members couple to respective longitudinally-extending portions of the L-shaped members adjacent distal ends of the longitudinally-extending portions of the L-shaped members.

(48) A vehicle wheel mounting apparatus according to any one of clauses 41 to 47, or any subsequent or preceding clause, wherein said antifriction members couple to the top and sides of respective longitudinally-extending portions of the L-shaped members.

(49) A vehicle wheel mounting apparatus according to any one of clauses 41 to 48, or any subsequent or preceding clause, wherein each said antifriction member comprises a plastic polymer material.

(50) A vehicle wheel mounting apparatus according to any one of clauses 41 to 49, or any subsequent or preceding clause, wherein each said antifriction member comprises a thermoplastic.

(51) A vehicle wheel mounting apparatus according to any one of clauses 41 to 50, or any subsequent or preceding clause, wherein each said antifriction member is configured to reduce wear.

(52) A vehicle wheel mounting apparatus according to any one of clauses 41 to 51, or any subsequent or preceding clause, wherein each said antifriction member is configured to reduce friction between the L-shaped members.

(53) A vehicle wheel mounting apparatus according to any one of clauses 41 to 52, or any subsequent or preceding clause, wherein each said antifriction member comprises Delrin®.

(54) A vehicle wheel mounting apparatus comprising: a pair of wheel-mounted elongate members; a pair of rollers rotatably coupled to respective said elongate members; and a pair of channels via which the first and second elongate members are telescoping coupled together, each of the channels being u-shaped or inverse u-shaped in lateral section.

(55) A vehicle wheel mounting apparatus comprising: a pair of rollers; a pair of wheel-mounted elongate members, each said elongate member including a first pair of spaced-apart bent portions via which a respective said roller is rotatably coupled thereto, and each said elongate member including a second pair of spaced-apart bent portions which form a channel, with the channels telescopically coupling together; and an actuator coupled to the elongate members, with selective actuation thereof enabling spacing between the rollers to be adjusted.

(56) A vehicle wheel mounting apparatus according to clause 55, or any preceding or subsequent clause, wherein the actuator is substantially positioned within at least one of said channels.

(57) A vehicle wheel mounting apparatus according to any one of clauses 55 to 56, or any preceding or subsequent clause, wherein the elongate members are shaped to enclose the actuator along a top and sides thereof.

(58) A vehicle wheel mounting apparatus according to any one of clauses 55 to 57, or any preceding or subsequent clause, wherein said elongate members include a third pair of spaced-apart bent portions extending along a periphery thereof

(59) A vehicle wheel mounting apparatus according to any one of clauses 55 to 58, or any preceding or subsequent clause, wherein each said bent portion functions at least in part as a stiffener.

(60) A vehicle wheel mounting apparatus comprising: a pair of telescopically coupled-together L-shaped planar members, each including one or more downwardly bent peripheral portions and a pair of bent portions; a plurality of wheels rotatably coupled to the planar members; and a pair of rollers, each extending between and rotatably coupling to a respective said pair of said bent portions of the planar members.

(61) A vehicle wheel mounting apparatus according to clause 60, or any preceding or subsequent clause, wherein each said planar member comprises sheet metal.

(62) A vehicle wheel mounting apparatus comprising: a pair of wheel-mounted elongate members with respective rollers coupled thereto; and an elongate threaded member threadably coupling to and extending between the elongate members, with actuation thereof selectively adjusting spacing of the rollers, wherein the elongate threaded member being substantially enclosed along a top and sides thereof and is accessible via a bottom thereof.

(63) A vehicle wheel mounting apparatus according to any one of clauses 54 to 62, or any preceding or subsequent clause, wherein the rollers are configured to receive therebetween and selectively elevate a vehicle wheel.

(64) In combination, a vehicle wheel and a vehicle wheel mounting apparatus according to any one of clauses 1 to 63, or any preceding or subsequent clause.

(65) In combination, a vehicle and a vehicle wheel mounting apparatus according to any one of clauses 1 to 63, or any preceding or subsequent clause.

(66) A method of manufacturing a vehicle wheel mounting apparatus, the method comprising: forming a pair of L-shaped blanks each comprising a laterally-extending portion and a longitudinally-extending portion; forming a pair of roller mounts by bending spaced-apart ends of the laterally-extending portions of the blanks in a first direction; rotatably coupling rollers to the roller mounts; forming a pair of telescoping channels by bending sides of the longitudinally-extending portions of the blanks in a second direction opposite the first direction; and operatively connecting together the channels via a length adjustment mechanism, with positioning of the rollers being adjustable thereby.

(67) A method according to clause 66, or any preceding or subsequent clause, including positioning the length adjustment mechanism substantially within at least one of the channels.

(68) A method according to any one of clauses 66 to 67, or any preceding or subsequent clause, including bending in the second direction sides of the laterally-extending portions opposite the roller mounts.

(69) A method according to any one of clauses 66 to 68, or any preceding or subsequent clause, including within the forming the pair of L-shaped blanks step, forming recessed regions along corners of the blanks to facilitate subsequent said bending steps.

(70) A method of manufacturing a vehicle wheel mounting apparatus according to any one of clauses 66 to 69 or any preceding or subsequent clause, including within operatively connecting step, threadably coupling an elongate threaded member to a distal end of a first said channel and a proximal end of a second said channel, with actuation thereof selectively adjusting spacing between the rollers.

(71) A method according to clause 70, or any preceding or subsequent clause, including within the channel forming step, further forming one said channel by bending the distal end of the longitudinally-extending portion of the first blank in the second direction; and within the threadably coupling step, threadably coupling a threaded end portion of the elongate threaded member to the distal end of the longitudinally-extending portion of the first blank so bent.

(72) A method according to any one of clauses 70 to 71, or any preceding or subsequent clause, including within the threadably coupling step, threadably coupling the elongate threaded member to the proximal end of the longitudinally-extending portion of the second blank adjacent a bit-engaging end of the threaded member.

(73) A method according to any one of clauses 66 to 72, or any preceding or subsequent clause, including forming the L-shaped blanks using sheet metal.

(74) A method according to any one of clauses 66 to 73, or any preceding or subsequent clause, including rotatably coupling spaced-apart wheels to the bottoms of the blanks.

(75) A method according to any one of clauses 66 to 74, or any preceding or subsequent clause, including positioning a vehicle wheel between the rollers and selectively moving the rollers closer to each other via the length-adjustment mechanism, with the vehicle wheel being selectively elevated thereby.

(76) A method according to any one of clauses 66 to 75, or any preceding or subsequent clause, including: positioning a vehicle wheel between the rollers; moving the rollers partially towards each other by actuating the length-adjustment mechanism in a first instance, with the vehicle wheel being supported by the rollers thereby; and raising the vehicle wheel towards a wheel hub assembly by moving the rollers further towards each other by further actuating the length-adjustment mechanism in a second instance.

(77) A method according to any one of clauses 66 to 75, or any preceding or subsequent clause, including moving the rollers to a first position via the length adjustment mechanism to carry a vehicle wheel thereon, positioning the vehicle wheel adjacent to a wheel hub assembly in need of tire/wheel replacement, and elevating the vehicle wheel towards the wheel hub assembly by moving the rollers to a second position in which the rollers are closer to each other relative to the first position.

(78) A method according to any one of clauses 66 to 77, or any preceding or subsequent clause, including within the forming the pair of L-shaped blanks step, cutting sheet metal into L-shapes.

(79) A method according to any one of clauses 66 to 78, or any preceding or subsequent clause, including within the forming the pair of L-shaped blanks step, laser cutting sheet metal into L-shapes.

(80) A method according to any one of clauses 66 to 79, or any preceding or subsequent clause, including after the forming the L-shaped blanks step, shaping the L-shaped blanks via brake forming.

(81) A method according to any one of clauses 66 to 80, or any preceding or subsequent clause, including within the forming the pair of roller mounts and the forming the pair of telescoping channels steps, brake forming the roller mounts and the pair of telescoping channels.

(82) A vehicle wheel mounting apparatus comprising: a pair of wheel-mounted elongate members; and a pair of rollers rotatably coupled to respective said elongate members; wherein the elongate members telescopically couple together, with at least one of the elongate members including a channel with a longitudinally-extending portion and first and second peripheral portions coupling to and extending along sides of the longitudinally-extending portion thereof, with the first peripheral portion extending at an acute angle relative to the longitudinally-extending portion and with the second peripheral portion extending at an acute angle relative to the longitudinally-extending portion.

(83) Apparatus including any new and inventive feature, combination of features, or sub-combination of features as described herein.

(84) Methods including any new and inventive steps, acts, combination of steps and/or acts or sub-combination of steps and/or acts as described herein.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A vehicle wheel mounting apparatus comprising:
a pair of wheel-mounted elongate members; and
a pair of rollers rotatably coupled to respective said elongate members;
wherein each said elongate member includes a channel, wherein the elongate members telescopically couple together via the channels thereof, wherein each said channel includes a longitudinally-extending portion and first and second peripheral portions coupling to and extending along sides of the longitudinally-extending portion thereof, wherein for each said channel the first peripheral portion thereof extends at an acute angle relative to the longitudinally-extending portion thereof, and wherein for each said channel the second peripheral portion thereof extends at an acute angle relative to the longitudinally-extending portion thereof.

2. A vehicle wheel mounting apparatus according to claim 1, wherein the rollers are shaped to receive therebetween and selectively elevate a vehicle wheel.

3. A method of manufacturing the vehicle wheel mounting apparatus of claim 1, the method comprising:
forming a pair of L-shaped blanks;
forming a pair of telescoping said channels by bending sides of longitudinally-extending portions of the blanks; and
operatively connecting the channels together via a length adjustment mechanism positioned substantially within at least one of the channels, with positioning of the rollers being adjustable thereby.

4. A method according to claim 3, including within the positioning step, coupling an elongate threaded member to a distal end of a first said channel and a proximal end of a second said channel, with actuation thereof selectively adjusting spacing between the rollers.

5. A method according to claim 3, including forming roller mounts by at least bending spaced-apart ends of laterally-extending portions of the blanks; and rotatably coupling rollers to the roller mounts.

6. A method according to claim 3, including one or more of:
forming the L-shaped blanks using sheet metal;
within the forming the pair of L-shaped blanks step, laser cutting sheet metal into L-shapes; and
after the forming the L-shaped blanks step, shaping the L-shaped blanks via brake forming.

7. A vehicle wheel mounting apparatus according to claim 1, wherein each said elongate member is made of sheet metal.

8. A vehicle wheel mounting apparatus according to claim 1, wherein each said elongate member has a top which is planar and L-shaped.

9. A vehicle wheel mounting apparatus according to claim 1, wherein a first said elongate member is shaped to nest within a second said elongate member.

10. A vehicle wheel mounting apparatus according to claim 1, wherein each said elongate member includes a pair of spaced-apart roller mounts, wherein each said roller includes first and second spring-loaded shafts extending axially outwards in opposite directions therefrom, and wherein each said roller releasably couples to a respective said pair of the roller mounts by inserting the first spring-loaded shaft thereof within a respective slot of a first said roller mount of the respective said pair of the roller mounts and then shifting the second spring-loaded shaft thereof axially so as to fit within a slot of a second said roller mount of the respective said pair of the roller mounts.

11. A vehicle wheel mounting apparatus according to claim 1, including an actuator via which the elongate members move from a retracted position to an extended position, with the rollers being closer together in the retracted position and more spaced-apart in the extended position, the actuator rotatably coupling to a first said elongate member via a first end portion thereof and rotatably coupling to a second said elongate member via a second end portion thereof.

12. A vehicle wheel mounting apparatus according to claim 11, wherein the apparatus includes a nut, wherein the apparatus includes an actuator mount which couples to the second said elongate member and forms a space through which the actuator mount is extendable, with the actuator mount being shaped to retain the nut within said space and inhibit rotation thereof, wherein the actuator is a threaded rod, and wherein the threaded rod threadably couples to said nut.

13. A vehicle wheel mounting apparatus according to claim 12, wherein the second said elongate member includes a tab which couples to and extends downwards from the longitudinally-extending portion thereof, wherein the tab has an aperture through which the threaded rod is extentable, wherein the actuator mount has an aperture through which the threaded rod is extendable, and wherein the nut is coaxial with the aperture of the tab and the aperture of the actuator mount.

14. A vehicle wheel mounting apparatus according to claim 13, wherein the actuator mount includes a first end portion which couples to the tab, wherein the actuator mount includes a second end portion parallel to the first end portion thereof and through which said aperture thereof extends, and wherein the actuator mount includes a connecting portion coupling together and extending perpendicular to the first and second end portions thereof.

15. A vehicle wheel mounting apparatus according to claim 14, wherein the nut fits between the tab and the second end portion of the actuator mount, wherein the connection portion of the actuator mount extends along and adjacent a thickness of the nut, and wherein the second end portion of the actuator mount has a distal end portion shaped to be received within a corresponding recess of one of the peripheral portions of the second said elongate member.

16. A vehicle wheel mounting apparatus comprising:

a pair of wheel-mounted elongate members with respective rollers coupled thereto, the elongate members telescopically coupling together, with at least one of the elongate members including a channel with a longitudinally-extending portion and first and second peripheral portions coupling to and extending along sides of the longitudinally-extending portion thereof, with the first peripheral portion extending outwards at an acute angle relative to the longitudinally-extending portion and with the second peripheral portion outwards extending at an acute angle relative to the longitudinally-extending portion; and an actuator via which the elongate members move from a retracted position to an extended position, with the rollers being closer together in the retracted position and more spaced-apart in the extended position.

17. A vehicle wheel mounting apparatus according to claim 16, wherein the actuator has a top, a bottom spaced-apart from the top thereof and a pair of spaced-apart sides extending from the top to the bottom thereof, and wherein the elongate members are shaped to substantially enclose the actuator along said top and sides and enable the actuator to be accessible via said bottom.

18. A vehicle wheel mounting apparatus according to claim 16, wherein each said elongate member is made of sheet metal.

19. A vehicle wheel mounting apparatus according to claim 16, wherein each said elongate member has a top which is planar and L-shaped.

20. A vehicle wheel mounting apparatus comprising:

a pair of wheel-mounted elongate members; and a pair of rollers rotatably coupled to respective said elongate members;

wherein each said elongate member includes a channel, wherein the elongate members telescopically couple together via the channels thereof, with each said channel being u-shaped in lateral section, wherein at least one said channel includes a longitudinally-extending portion and first and second peripheral portions coupling to and extending along sides of the longitudinally-extending portion thereof, with the first peripheral portion extending at an acute angle relative to the longitudinally-extending portion and with the second peripheral portion extending at an acute angle relative to the longitudinally-extending portion.

\* \* \* \* \*